US008012008B2

(12) United States Patent
Sato

(10) Patent No.: US 8,012,008 B2
(45) Date of Patent: Sep. 6, 2011

(54) CARD GAMING MACHINE HAVING A PLURALITY OF CARD DECKS AND CARD GAME PLAYING METHOD

(75) Inventor: Junpei Sato, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 836 days.

(21) Appl. No.: 12/047,134

(22) Filed: Mar. 12, 2008

(65) Prior Publication Data

US 2008/0227511 A1 Sep. 18, 2008

(30) Foreign Application Priority Data

Mar. 14, 2007 (JP) ................................. 2007-065830

(51) Int. Cl.
*G06F 17/00* (2006.01)

(52) U.S. Cl. ........................................................ 463/11

(58) Field of Classification Search .............. 463/11-13, 463/16-25, 26, 28, 29; 273/294, 309, 292, 273/296, 306
See application file for complete search history.

(56) References Cited

U.S. PATENT DOCUMENTS

| | | | | |
|---|---|---|---|---|
| 7,159,868 | B2 * | 1/2007 | Webb | 273/274 |
| 2002/0103029 | A1 * | 8/2002 | Finlayson et al. | 463/42 |
| 2004/0248636 | A1 | 12/2004 | Webb | |
| 2007/0021171 | A1 * | 1/2007 | Pavlovich et al. | 463/16 |
| 2008/0227511 | A1 | 9/2008 | Sato | |
| 2009/0124317 | A1 * | 5/2009 | Dinkla | 463/13 |
| 2010/0144445 | A1 * | 6/2010 | Gioia et al. | 463/42 |

FOREIGN PATENT DOCUMENTS

EP 1743679 1/2007

OTHER PUBLICATIONS

Macao Official Action, dated Dec. 15, 2009.

* cited by examiner

*Primary Examiner* — Ronald Laneau
(74) *Attorney, Agent, or Firm* — NDQ&M Watchstone LLP

(57) ABSTRACT

Two card decks A and B are allocated to and shared by a dealer and each of "main players 1 to 5". Two cards to be dealt respectively to the dealer and each of the main players are determined from the two card decks A and B. On the other hand, two card decks C and D are allocated to "sub player 3". Two cards to be dealt to the sub player are determined from the two card decks C and D. In the determination, the same cards which dealt to the dealer are excluded from the two card decks C and D. Similarly, with respect to "sub player 5", two cards to be dealt to the sub player are determined from two card decks E and F. Further, with respect to "sub player 8", two cards to be dealt to the sub player are determined from two card decks G and H.

7 Claims, 16 Drawing Sheets

CARD GAMING MACHINE HAVING A PLURALITY OF CARD DECKS AND CARD GAME PLAYING METHOD

CROSS-REFERENCE TO RELATED APPLICATIONS

This application is based upon and claims a priority from the prior Japanese Patent Application No. 2007-065830 filed on Mar. 14, 2007, the entire contents of which are incorporated herein by reference.

BACKGROUND

1. Field of the Invention

This disclosure relates to a card gaming machine having a plurality of card decks, and a card game playing method.

2. Description of Related Art

Conventionally, card gaming machines for playing card games such as Blackjack, Pai Gow Poker, or Draw Poker are arranged in a casino or a game arcade. Here, in above card games, the game is processed by using the cards with marks (for example, "Heart A"). Then, an award is provided based on the winning or losing determined by a hand of the cards dealt to a player and a hand of the cards dealt to a dealer, and the number of bets betted on a result of the game by the player.

In the above card game, even in a case that a plurality of players participate, like a table game performing with a real card, a common card deck (for example, in a card game, a card deck consist of one group of 53 cards adding a joker card) is used for the participating players.

As described in US Patent Application Publications No. 2002/0,103,029A1, in a card game which is executed under network environment on condition that players more than two person participate, there is the danger of injustice that the players show each other's hands to each other when the card game proceeds. Therefore, to prevent the card game from awarding payment by the injustice, a card deck assigned to each of the players is used individually in the card game. In this manner, there is the card game machine pretending that all players participate in the same card game.

In the card game machine which a plurality of players can participate in, when a card game will be executed by using the common card deck, there is a sense of reality of a casino in the card game. However, if more new terminals are provided so as to increase players who can participate in the card-game, as the number of new terminals increase, necessary processing time per one game gets longer to determine all player's outcome.

In addition, in the card game machine which a plurality of players can participate in, if a card game will be executed by using a card deck assigned to each of the players individually, it is difficult to execute the card game that each of the players plays with an one dealer together. Therefore, there is not a sense of reality of a casino in the card game.

SUMMARY OF THE INVENTION

It is an object of the disclosure to provide a novel card gaming machine and a card game playing method by having a plurality of card decks which are used individually for a plurality of participating players.

To achieved the object of the disclosure, there is provided a card gaming machine, comprising: a plurality of main terminals at which each player can play a card game respectively; a plurality of extended terminals at which each player can play a card game respectively; a plurality of card decks consisting one group of a plurality of cards required for a card game, respectively; and a processor programmed to execute the same card game at the same time at each of the main terminals and each of the extended terminals through controlling each of the main terminals and each of the extended terminals by executing processes of: (a) progressing the card game at each of the main terminals by sharing and using a first predetermined number of the card decks allocated to all of the main terminals from all of the card decks; and (b) respectively progressing the card game at each of the extend terminals by individually using a second predetermined number of the card decks allocated respectively to each of the extend terminals from all of the card decks.

Further, according to another aspect of the present invention, there is provided a card gaming machine, comprising: a plurality of main terminals at which each player can play a card game respectively; a plurality of extended terminals at which each player can play a card game respectively; a plurality of card decks consisting one group of a plurality of cards required for a card game, respectively; and a processor programmed to execute the same card game at the same time at each of the main terminals and each of the extended terminals through controlling each of the main terminals and each of the extended terminals by executing processes of: (a) progressing the card game at each of the main terminals by sharing and using a first predetermined number of the card decks allocated to all of the main terminals from all of the card decks; (b) respectively progressing the card game at each of the extend terminals by individually using a second predetermined number of the card decks allocated respectively to each of the extend terminals from all of the card decks; (c) dealing common dealer cards used commonly at each of the main terminals from the card decks of the first predetermined number at time of starting to progress the card game at each of the main terminals; (d) respectively dealing individual dealer cards used individually at each of the extend terminals from the card decks of the second predetermined number at time of starting to progress the card game at each of the extend terminals respectively; and (e) making a suit and a rank of the common dealer cards agree with a suit and a rank of each of the individual dealer cards at time of dealing each of the dealer cards respectively.

Further, according to another aspect of the present invention, there is provided a card gaming machine, comprising: a plurality of main terminals at which each player can play a card game respectively; a common display device sharing by all of the main terminals; a plurality of extended terminals at which each player can play a card game respectively; a plurality of individual display devices provided respectively on each of the extend terminals; a plurality of card decks consisting one group of a plurality of cards required for a card game, respectively; and a processor programmed to execute the same card game at the same time at each of the main terminals and each of the extended terminals through controlling each of the main terminals, the common display device, each of the extended terminals, and each of the individual display devices by executing processes of: (a) progressing the card game at each of the main terminals by sharing and using a first predetermined number of the card decks allocated to all of the main terminals from all of the card decks; (b) respectively progressing the card game at each of the extend terminals by individually using a second predetermined number of the card decks allocated respectively to each of the extend terminals from all of the card decks; (c) displaying the virtual dealer on the common display device at time of progressing the card game at each of the main terminals; and (d) displaying a part of the virtual dealer, which are displaying on the common display device, on each of the individual display devices at time of progressing the card game at each of the extend terminals respectively.

Furthermore, according to another aspect, there is provided a card game playing method, comprising steps of: so as to progress an identical card game among main players and among sub players by using a plurality of card decks, (a) progressing the card game among the main players by sharing and using a first predetermined number of the card decks allocated to all of the main players from all of the card decks; and (b) respectively progressing the card game for each of the sub players by individually using a second predetermined number of the card decks allocated respectively to each of the sub players from all of the card decks.

DETAILED DESCRIPTION OF THE PREFERRED EMBODIMENTS

In a card gaming machine according to the present invention, a plurality of main players and a plurality of sub players can play games at the same time. In this regard, each main player can play only a main game that is a card game. On the other hand, each sub player can play a game by selecting either participating in the main game in which each main player plays or playing a sub game in which the sub player bets on the winning or losing of each main player. In other words, each sub player can select the main game or the sub game.

Then, card decks of a predetermined number are shared by a dealer and each main player when a main game is executed. On the other hand, card decks of the same number are individually allocated to be used by each sub player having selected a main game when the identical main game is executed.

In this regard, a card deck is referred to as a group unit of a plurality of cards used in a main game. In this context, a card deck consists of 53 cards. The 53 cards consist of a joker and 52 cards. The 52 cards consist of 13 types of ranks (A (Ace, equivalent to 1), 2, 3, 4, 5, 6, 7, 8, 9, 10 J (Jack, equivalent to 11), Q (Queen, equivalent to 12), and K (King, equivalent to 13)) and four kinds of suits (spade, heart, diamond, club).

Figure 1:
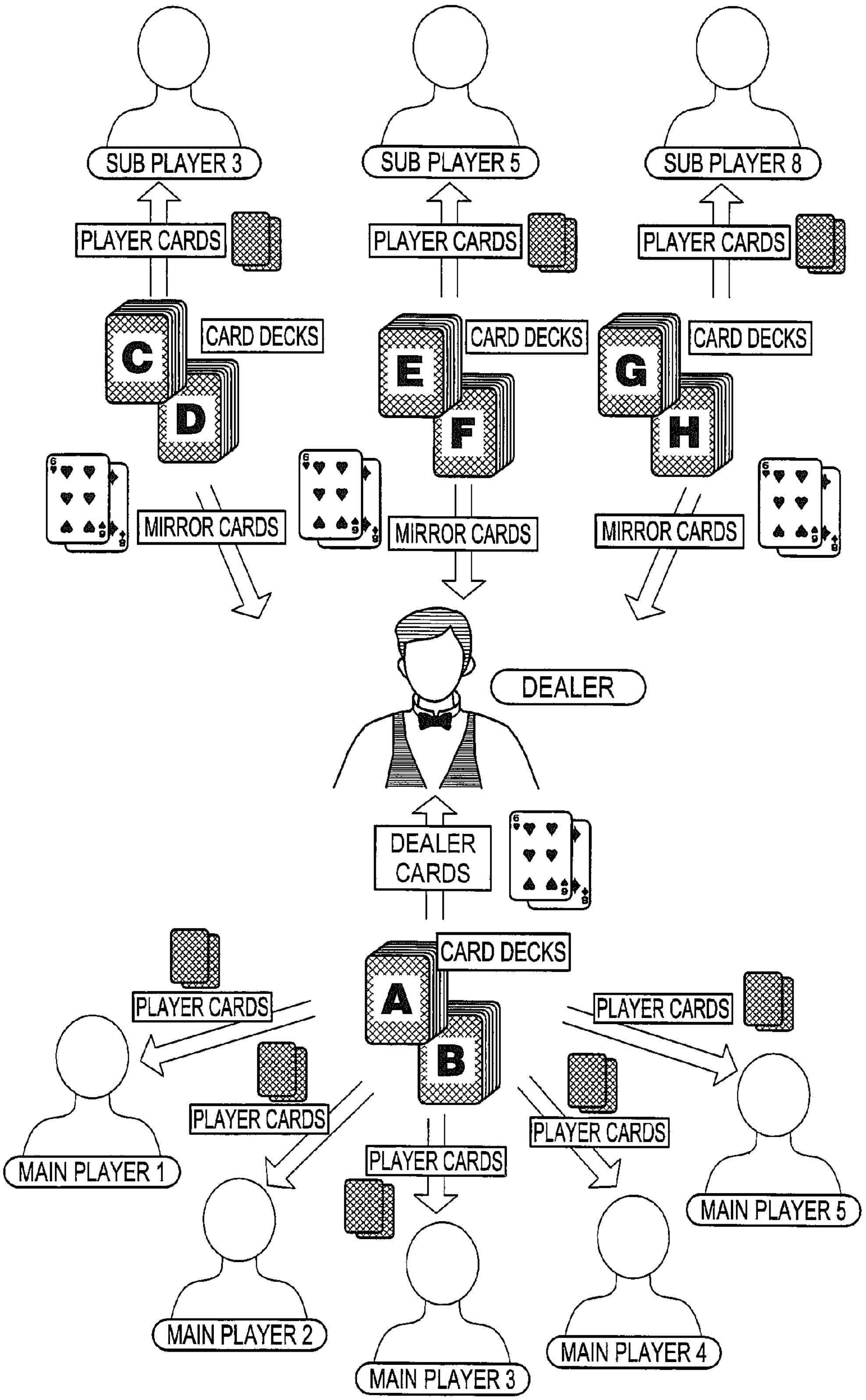
FIG. 1 is a view showing an example of a specific situation of card decks for use in a main game.

FIG. 1 shows an example of a specific situation of card decks used in a main game. In one example shown in FIG. 1, three sub players have selected a main game, and eight card decks A to H are prepared.

Then, two card decks A and B are allocated to and shared by a dealer and each of the main players 1 to 5. In other words, in step S1017 or the like described later, first, two cards to be dealt to the dealer and each of the main players 1 to 5 are determined from two card decks A and B. In this regard, in the example shown in FIG. 1, two cards "Heart 6" and "Diamond 8" are dealt to the dealer.

On the other hand, two card decks C and D are allocated to one ("sub player 3") of three sub players having selected a main game. Then, in step S1017 or the like described later, two cards to be dealt to the sub player are determined from two card decks C and D on condition that the same cards which dealt to the dealer are excluded ("Heart 6" and "Diamond 8" in the example shown in FIG. 7). Similarly, with respect to one of three sub players ("sub player 5") having selected a main game, two cards to be dealt to the sub player are determined from two card decks E and F. Further, with respect to one of three sub players having selected a main game ("sub player 8"), two cards to be dealt to the sub player are determined from two card decks G and H.

In this manner, even if card decks different from each other relative to main players or sub players having selected a main game are allocated, in other words, in the example shown in FIG. 1, even if two card decks A and B are allocated to each of the main players 1 to 5, two card decks C and D are allocated to the "sub player 3", two card decks E and F are allocated to a "sub player 5", and two card decks G and H are allocated to a "sub player 8", two cards to be dealt to the dealer are set to "Heart 6" and "Diamond 8" by all means so as to be common to all card decks.

In the example shown in FIG. 1, the number of card decks allocated to the dealer and each of the main players in common is two, and the number of card decks individually allocated to each of the sub players having selected a main game is two, too. In regard to this, card decks of the number other than two may be allocated in common or card decks of different numbers may be allocated individually. In addition, the number of card decks individually allocated to each sub player having selected a main game may be different in part or all of the sub players.

Hereinafter, embodiments of the present invention will be described with reference to the accompanying drawings.

[1. Appearance of the Gaming Machine]

Figure 2:
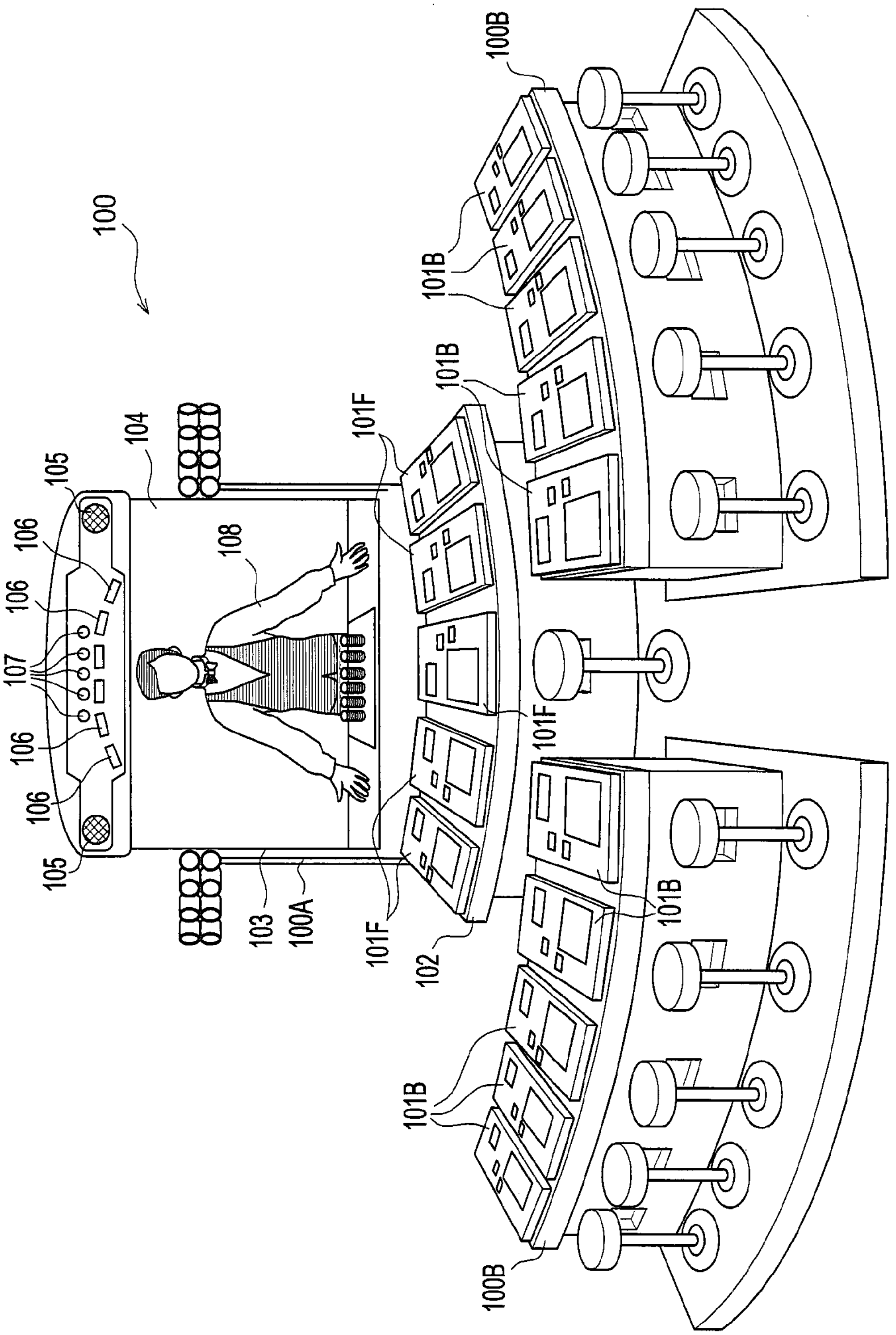
FIG. 2 is an external perspective view of a gaming machine.

FIG. 2 shows an appearance of a gaming machine according to the present embodiment. While the following description will be given assuming that a program for executing Black Jack that is one of the card games to be executed by the gaming machine is installed on a gaming machine 100 according to the present embodiment, this does not imply that the gaming machine according to the present invention is limitative to that which executes Blackjack.

As shown in FIG. 2, the gaming machine 100 has a main game unit 100A and two sub game units 100B connected communicably with the main game unit 100A.

The main game unit 100A has a terminal section 102 on which five main player terminals 101F called satellites are arranged in a substantially fan-like shape; and a panel portion 103 is mounted on a part of the terminal section 102. The mounting position of the panel portion 103 is located in front of operator (player) of the terminal section 102. 5 sub player terminals 101B are incorporated in the sub game unit 100B. A player who is an operator of the main player terminal 101F is called a main player, and a player who is an operator of the sub player terminal 101B is called a sub player. In addition, the sub player terminal 101B is equivalent to an "extended terminal" of the present invention. In the present embodiment, a main player plays a main game which the main game unit 100A provides (all games including card games such as Blackjack, Baccarat, and poker or table games such as roulette to be executed on a casino or a game arcade). A sub player selects a main game played by a main player, or a sub game to bet a gaming value on a result of a main game which a main player played, and plays the selected game.

A panel portion 103 has a front display 104 that is a display device such as a liquid crystal display device; a speaker 105, a lamp 106, and a LED 107. The front display 104 notifies information relating to general games which a main player and/or a sub player participate in to players in common.

The front display 104 displays notification of starting a betting period, notification of the end of betting, and notification of a result of the game or the like by means of animation image 108 of a dealer or other images.

The speaker 105, the lamp 106, and the LED 107 execute effects relating to a play, for example, effects caused by output of BGM or sound effects or lighting on/off or the like in accordance with an image display of the front display 104, or alternatively, independently of the image display of the front display 104.

Figure 3:
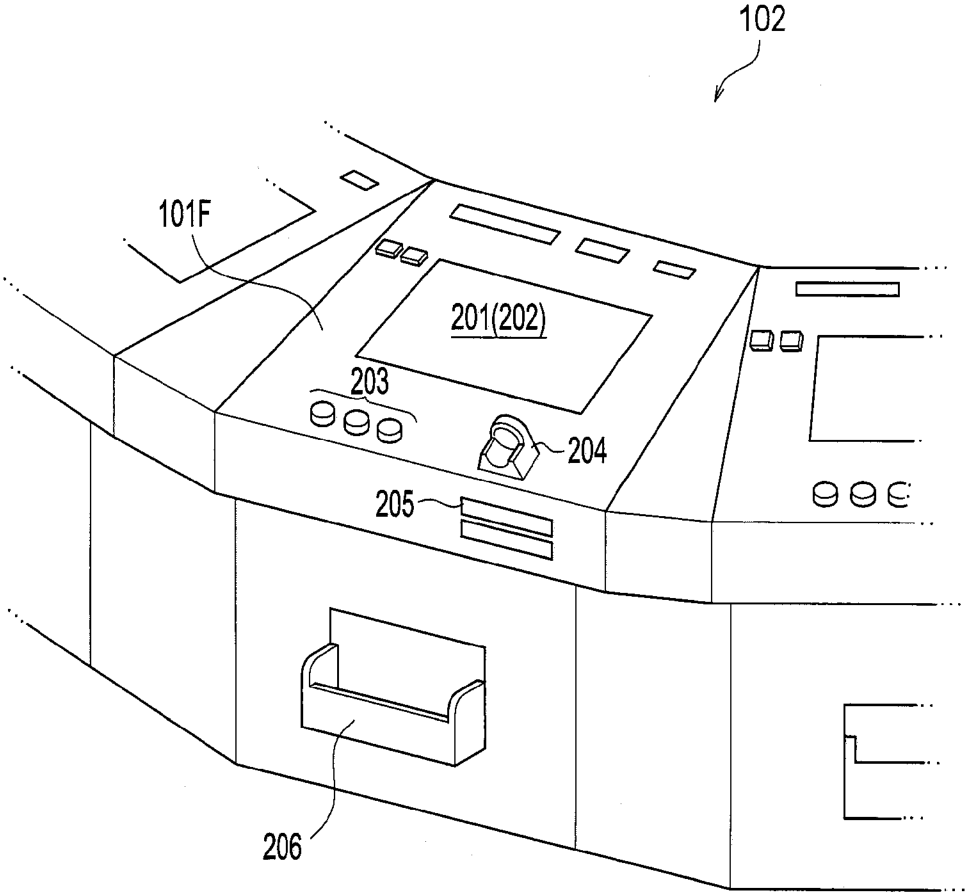
FIG. 3 is a perspective view of a player terminal.

FIG. 3 shows a partial enlarged view of a terminal section 102. Hereinafter, with reference to FIG. 3, the terminal section 102 and the main player terminal 101F incorporated therein will be described.

The main player terminal 101F has a liquid crystal display 201 for providing information relating to a game to a player on a top face thereof. The liquid crystal display 201 is covered with the transparent touch panel 202. Together with an input interface screen displayed by the liquid crystal display 201, buttons 203 that are a plurality of buttons for a player to use in a game, such as a PAYOUT button, are arranged at the near side of the liquid crystal display 201 for a player. In addition, a coin insertion slot 204 for a player to insert a gaming value/medium such as a coin, a medal, or a chip (hereinafter, merely referred to as a "coin") is arranged at the right side of the buttons 203. A bill insertion slot 205 for a player to insert a bill is provided at the lower side of the coin insertion slot 204. A coin detecting sensor (not shown) is provided at the coin insertion slot 204. When a coin is inserted into the coin insertion slot 204, a coin detection signal is outputted from the coin detecting sensor. In addition, a bill detecting sensor (not shown) is provided at the bill insertion slot 205. When a bill is inserted into the bill insertion slot 205, a bill detection signal is outputted the from the bill detecting sensor.

A coin payout opening 206 is provided at the front lower part of the main player terminal 101F. When a player depresses a PAYOUT button that is one of the buttons 203, coins of the number which corresponds to all or part of player owned credit values stored in the main player terminal 101F are ejected from the coin payout opening 206, so that the player can get the ejected coins.

[2. Exemplary Configuration of the Main Control Unit]

Figure 4:
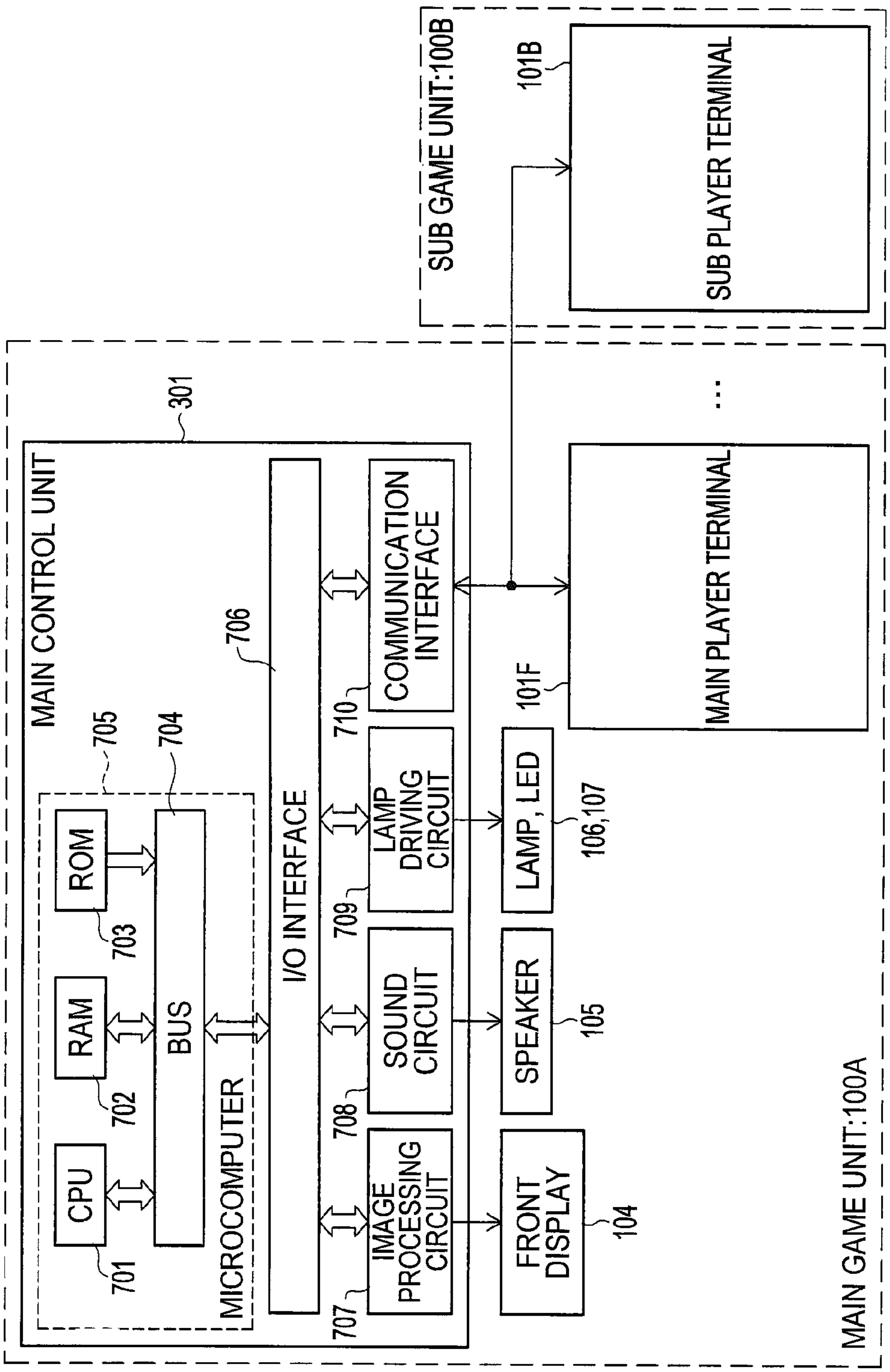
FIG. 4 is a functional block diagram showing an exemplary configuration of a main control unit in a main game unit.

Next, an exemplary configuration of a main control unit 301 in the main game unit 100A will be described with reference to FIG. 4. FIG. 4 is a block diagram of the gaming machine 100 consisting essentially of the main control unit 301 in the main game unit 100A.

The main control unit 301 basically includes a microcomputer 705 as a core. And the microcomputer 705 includes a CPU 701, a RAM 702, a ROM 703, and a bus 704 for transmitting data among the CPU 701, the RAM 702, the ROM 703, and the ROM 703, and the RAM 702 are connected to the CPU 701 through the bus 704. In the ROM 703, various programs and data tables or the like necessary for executing processes to control the gaming machine 100 are stored. In addition, the RAM 702 is a memory to temporarily store various data calculated by the CPU 701.

The microcomputer 705, in more detail, the CPU 701 is connected to an image processing circuit 707 through an I/O interface 706. The image processing circuit 707 is connected to the front display 104, and executes drive control of the front display 104.

The image processing circuit 707 is constituted of a program ROM, an image ROM, an image control CPU, a work RAM, a VDP (Video Display Processor), and a video RAM or the like. The program ROM stores image control programs relating to a display on the front display 104 and various selection tables. In addition, the image ROM stores dot data for forming an image such as dot data for forming an image on the front display 104. In addition, the image control CPU determines an image to be displayed on the front display 104 from among the dot data stored in advance in the image ROM in accordance with the image control programs stored in advance in the program ROM and parameters set by means of the CPU 701. In addition, the work RAM is a temporary storing means employed when the image control CPU executes the image control programs. In addition, the VDP generates image data responsive to the display contents determined by the image control CPU, and, outputs the generated image data to the front display 104. The video RAM is a temporary storing means employed when the VDP forms an image.

Further, a speaker 105 is connected to the microcomputer 705, and in more detail, the CPU 701 through a sound circuit 708. The speaker 105 generates various sound effects or BGMs when a variety of effects are executed based on an output signal from the sound circuit 708.

In addition, the lamp 106 and the LED 107 are connected to the microcomputer 705, and in more detail, the CPU 701, through a lamp driving circuit 709. The lamp 106 and the LED 107 is arranged in number on the front face of the gaming machine 100, and its illumination is controlled by the lamp driving circuit 709, based on a drive signal from the CPU 701 when various effects are carried out.

In addition, the main player terminals 101F and the sub player terminals 101B in the sub game unit 100B are connected to the microcomputer 705, and in more detail, the CPU 701 through a communication interface 710 so that bi-directional communication between the CPU 701 and the main player terminal 101F and bi-directional communication between the CPU 701 and the sub player terminal 101B can be made. The microcomputer 705, and in more detail, the CPU 701 can transmit commands and requests with each main player terminal 101F, and the main control unit 301 associates with the main player terminal 101F to control the main game. Similarly, the microcomputer 705, in more detail, the CPU 701 can transmit commands and requests with each sub player terminal 101B, and the main control unit 301 associates with the sub player terminal 101B to control the main game or the sub game.

[3. Exemplary Configuration of the Main Player Terminal]

Figure 5:
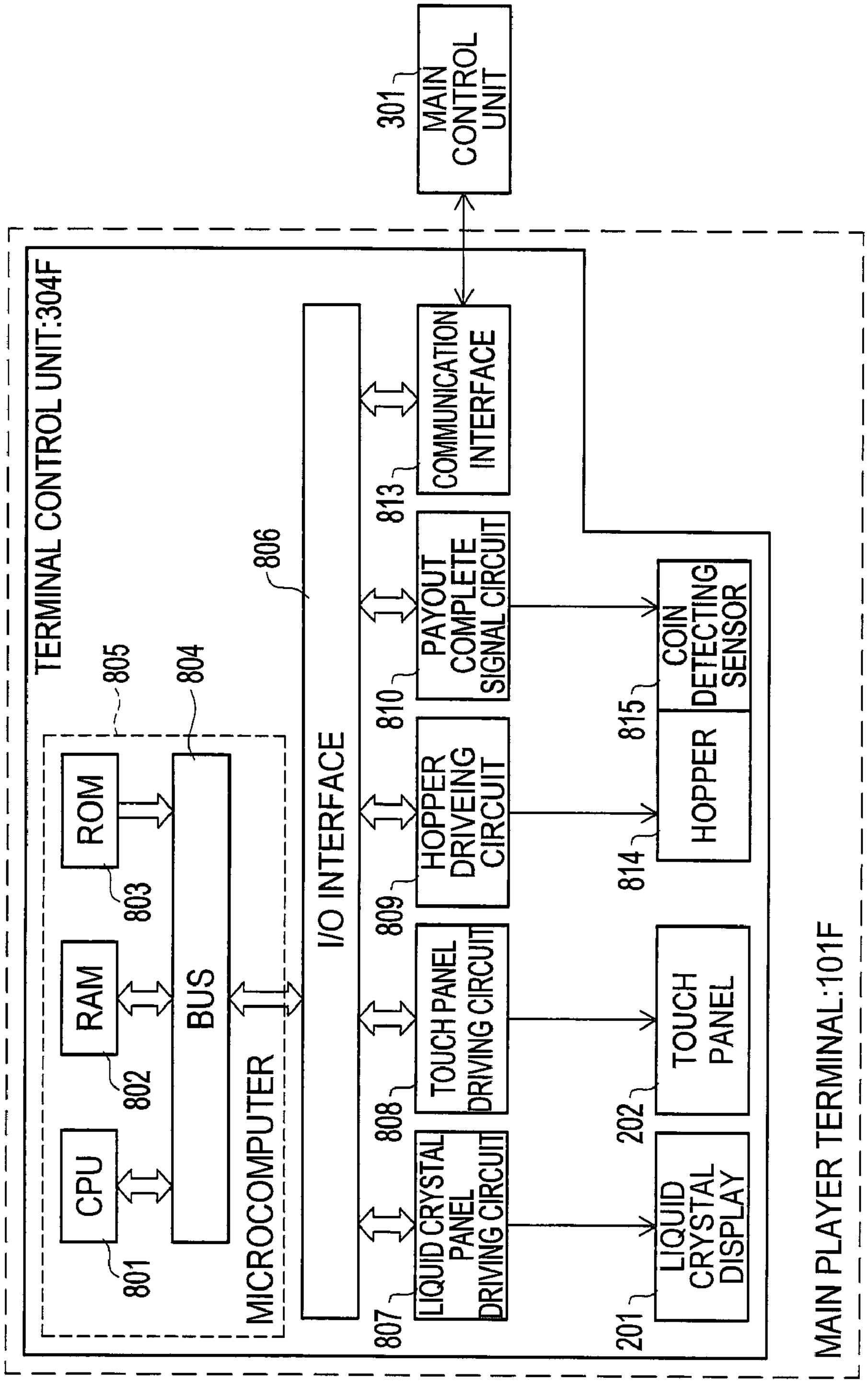
FIG. 5 is a functional block diagram showing an exemplary configuration of a main player terminal.

Next, an exemplary configuration of the main player terminal 101F will be described with reference to FIG. 5. FIG. 5 is a functional block diagram showing an example of a control system of the main player terminal 101F.

The core of the main player terminal 101F is a terminal control unit 304F. The terminal control unit 304F includes a microcomputer 805 as a core. The microcomputer 805 is basically constituted of a CPU 801, a RAM 802, a ROM 803, and a bus 804 for transmitting data therebetween, and the ROM 803 and the RAM 802 are connected to the CPU 801 through the bus 804. The ROM 803 stores required processing operations in controlling the main player terminal 101F, for example, various programs and a data table or the like. In addition, the RAM 802 is a memory for temporarily storing various data calculated by the CPU 801.

The microcomputer 805, in more detail, the CPU 801 is connected to a liquid crystal panel driving circuit 807 through an I/O interface 806, and the liquid crystal panel driving circuit 807 is connected to the liquid crystal display 201 and controls driving of the liquid crystal display 201.

In addition, the microcomputer 805, in more detail, the CPU 801 is connected to a touch panel driving circuit 808 through the I/O interface 806, and the touch panel driving circuit 808 outputs coordinate data on a touch position on the touch panel 202.

A hopper 814 is connected to the microcomputer 805, in more detail, the CPU 801 through a hopper driving circuit 809. When a drive signal is outputted from the CPU 801 to the hopper driving circuit 809, the hopper 814 pays out a predetermined number of coins from the coin payout opening 206. In addition, a coin detection sensor 815 is connected to the CPU 801 through a payout complete signal circuit 810. The coin detection sensor 815 is arranged inside of the coin payout opening 206. In the case where the coin detection sensor 815 has been detected that a predetermined number of coins are paid out from the coin payout opening 206, a coin payout detection signal is outputted from the coin detection sensor 815 to the payout complete signal circuit 810. Based on this output, the payout complete signal circuit 810 outputs a payout complete signal to the CPU 801.

Further, the microcomputer 805, in more detail, the CPU 801 is connected to the main control unit 301 through a communication interface 813 so that bi-directional communication between the CPU 801 and the main control unit 301 can be made. The CPU 801 can transmit commands, requests and data with the main control unit 301, and the main control unit 301 associates with the main player terminal 101F to control the main game.

[4. Exemplary Configuration of the Sub Player Terminal]

A configuration of a control system of the sub player terminal 101B is identical to that of the main player terminal section 101F. The identical elements are designated by the same reference numerals in FIG. 5, and a detailed description thereof is omitted.

[5. Game Selection]

Figure 6:
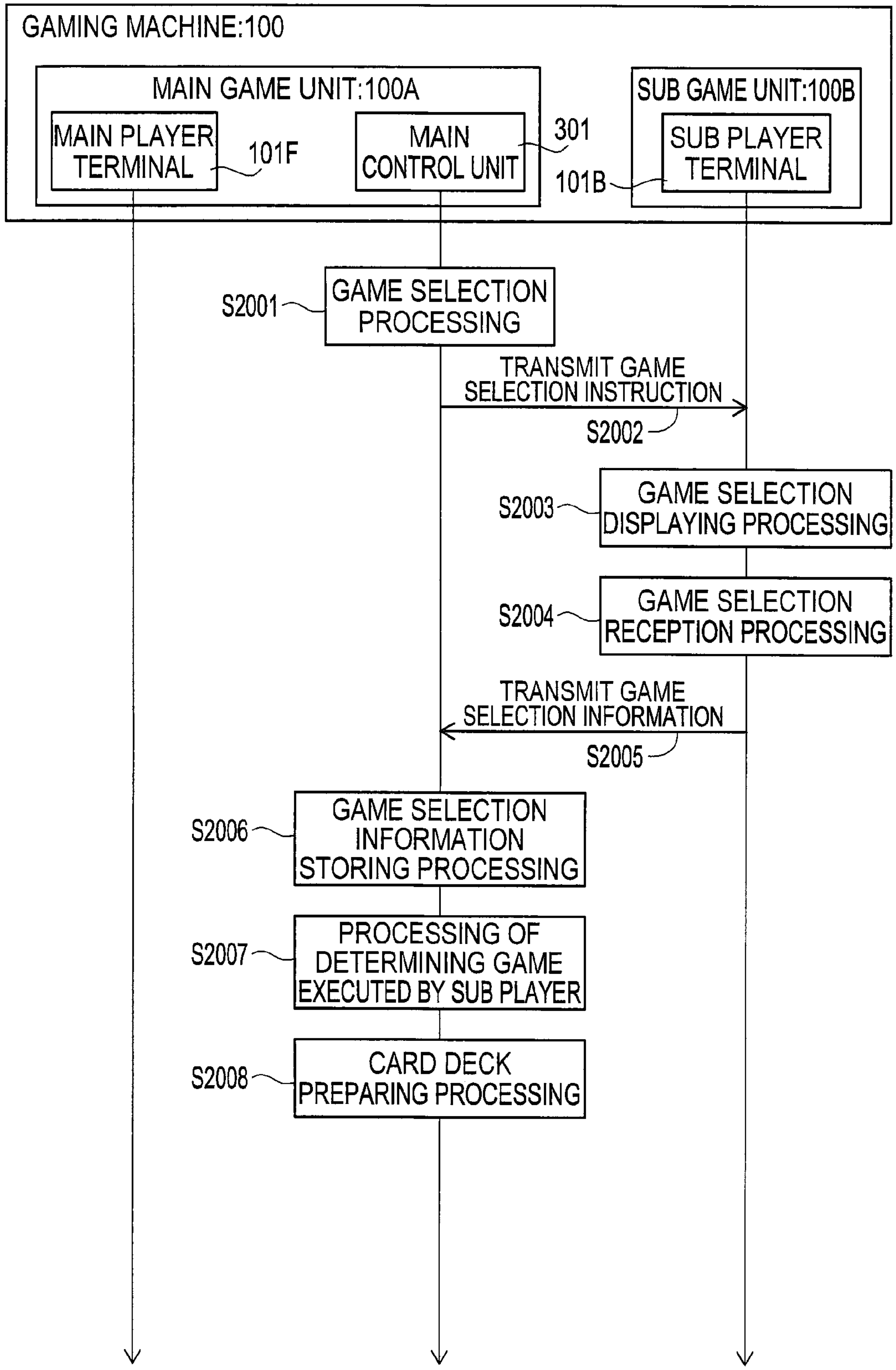
FIG. 6 is a sequence diagram showing an exemplary operation of the gaming machine, to be executed before a sequence diagram of FIG. 8.

Next, an exemplary operation of game selection in the gaming machine 100 according to the present embodiment will be described with reference to FIG. 6. FIG. 6 is a sequence diagram showing an exemplary operation of the gaming machine 100. This operation is made before the operation of FIG. 8 described later.

In FIG. 6, only one of the main player terminals 101F and the sub player terminals 101B is illustrated as a typical example, and other main player terminals 101F and sub player terminals 101B are not illustrated.

First, the main control unit 301 executes a game selection processing (step S2001). The game selection processing is a processing for determining whether or not a game start condition is realized. When the condition is not realized, a game selection instruction is generated. The main control unit 301 executes the game selection processing (step S2001), and then, transmits the generated game selection instruction to each sub player terminal 101B (step S2002).

The sub player terminal 101B having received this game selection instruction executes a game selection displaying processing (step S2003). The game selection displaying processing is a processing for displaying information of announcing to a sub player the fact that a sub player can select a main game or a sub game, on the liquid crystal display 201 of the sub player terminal 101B serving as the selection interface screen for a sub player.

Figure 7:
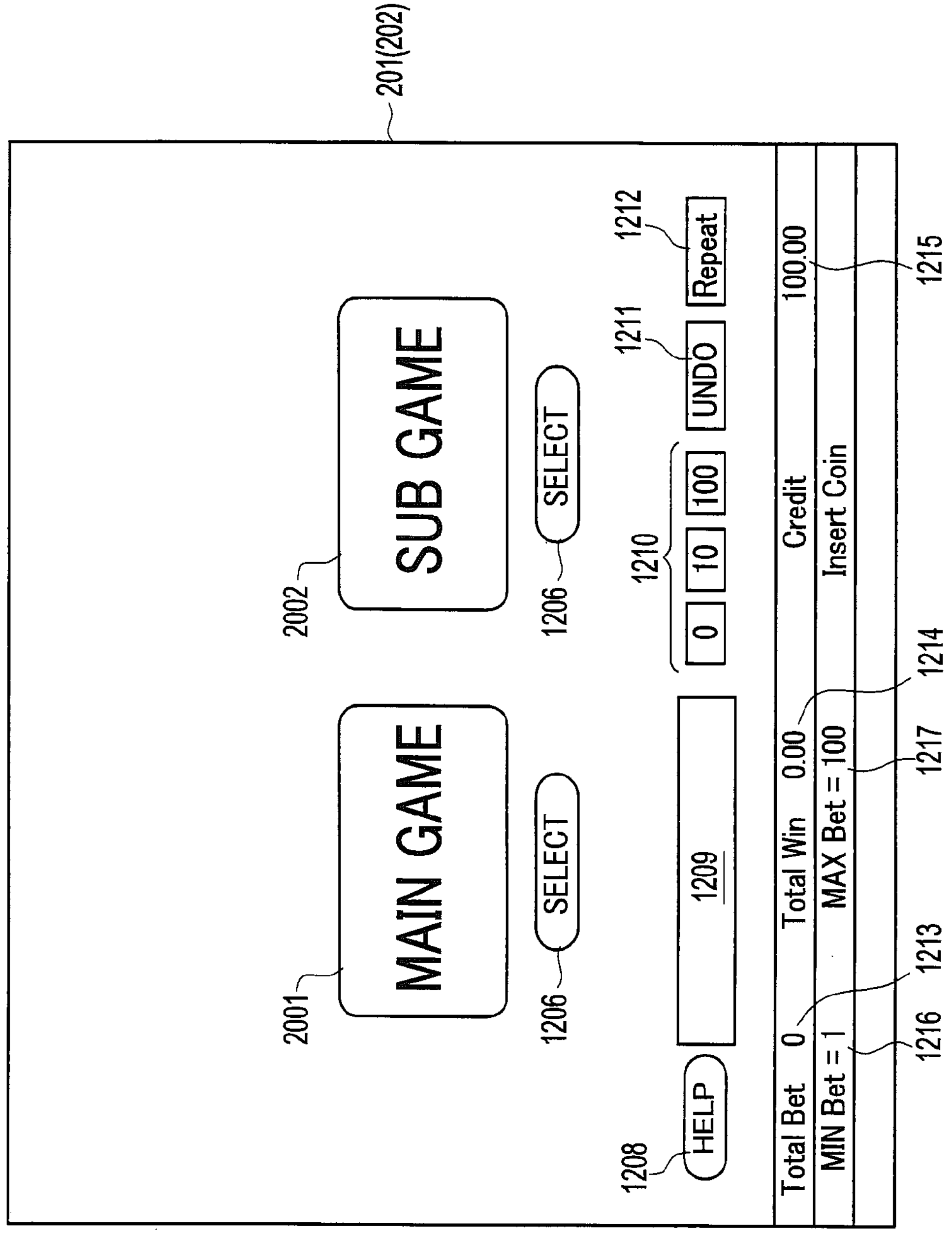
FIG. 7 is a view showing an example of a screen displayed on a liquid crystal display of a sub player terminal.

FIG. 7 described above shows an exemplary screen displayed on the liquid crystal display 201 of the sub player terminal 101B after the game selection displaying processing is executed.

FIG. 7 is a view showing a selection interface screen displayed on a liquid crystal display 201 when each sub player selects the main game or the sub game. On the screen shown in FIG. 7, a main game display area 2001 showing "MAIN GAME" and a sub game display area 2002 showing "SUB GAME" are displayed, and further, select button areas 1206 are provided, respectively, under the main game display area 2001 and the sub game display area 2002. Then, when a sub player touches the inside of the select button area 1206 arranged under the main game display area 2001 through a transparent touch panel 202 that covers the liquid crystal display 201, the sub player can select the main game. In addition, when the sub player touches the inside of the select button area 1206 arranged under the sub game display area 2002, the sub player can select the sub game.

Figure 10:
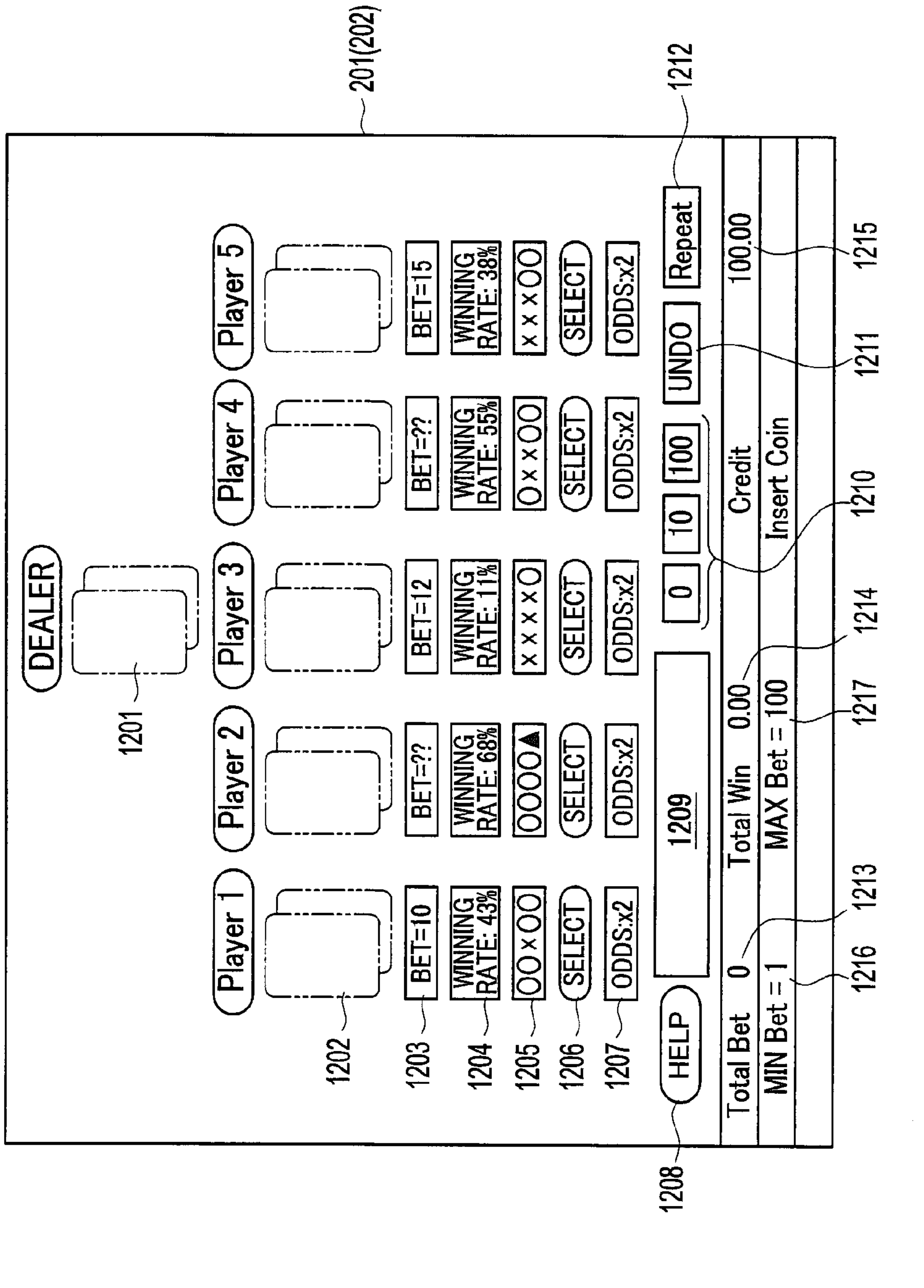
FIG. 10 is a view showing an example of a screen displayed on the liquid crystal display of the sub player terminal.

In this screen example, in comparison with an exemplary screen shown in FIG. 10 described later, there are not displayed: a dealer cards image display area 1201 (refer to FIG. 10), a main player cards image display area 1202 (refer to FIG. 10), a betting amount display area 1203 (refer to FIG. 10), a winning rate display area 1204 (refer to FIG. 10), a winning and losing history display area 1205 (refer to FIG. 10), and an odds display area 1207 (refer to FIG. 10) are not displayed. Instead of them, the main game display area 2001 showing "MAIN GAME" and the sub game display area 2002 showing "SUB GAME" are displayed. Further, select button areas 1206 are arranged, respectively, under the main game display area 2001 and the sub game display area 2002. Other contents are identical to those of an exemplary screen shown in FIG. 10 described later. By means of this screen example, a sub player who is an operator of the sub player terminal 101B is aware of necessity of selecting a game.

After the game selection displaying processing (step S2003), a sub player terminal 101B executes a game selection reception processing (step S2004). The game selection reception processing is a processing for promoting an input relating to a selection or determination of a main game or a sub game, and acquiring the inputted contents as data.

With reference to the selection interface screen of FIG. 7 described above, a sub player inputs to a sub player terminal 101B a selection of a main game or a sub game with the use of the select button areas 1206 or the like. On the screen of FIG. 7, as described above, when a sub player touches the select button area 1206 arranged under the main game display area 2001 through the transparent touch panel 202 covering the liquid crystal display 201, the sub player can select the main game. In addition, when a sub player touches the select button area 1206 arranged under the sub game display area 2002, the sub player can select the sub game. Then, when a sub player touches the select button areas 1206, a transmission of game selection information described later is executed.

A sub player terminal 101B generates game selection information serving as information that corresponds to a game (main game or sub game) selected by a sub player, and then, transmits this game selection information to the main control unit 301 (step S2005). This game selection information is transmitted from each sub player terminal 101B to the main control unit 301.

Here, after a predetermined time has elapsed since the end of the previous main game, in the case where neither of the select button areas 1206 is touched, the sub player terminal 101B assumes that the play of a sub game has been selected, and generates the game selection information.

When the main control unit 301 having received game selection information receives game selection information from all of the sub player terminals 101B, the main control unit 301 generates game selection information for storage based on the received game selection information, and then, executes a game selection information storing processing serving as a processing for storing this generated information (step S2006). By means of this processing, the main control unit 301 stores which game (main game or sub game) has been selected by each sub player.

After that, the main control unit 301 executes a processing of determining a game executed by a sub player (step S2007). The processing of determining a game executed by a sub player determines a game to be executed by each sub player, based on the game selection information described above.

In this manner, at a sub player terminal 101B operated by a sub player having selected a sub game, the sub game is executed as described later.

Figure 13:
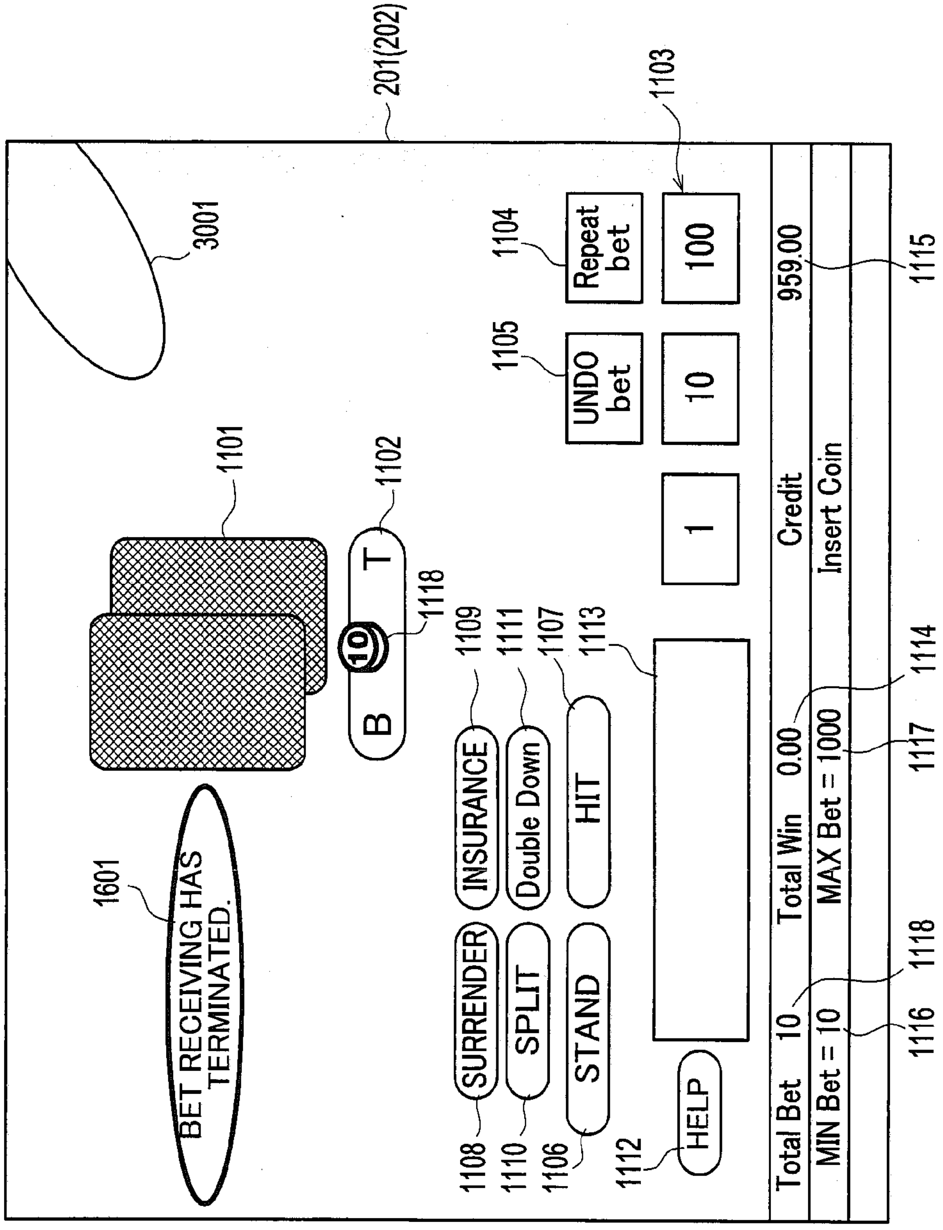
FIG. 13 is a view showing an example of a screen displayed on the liquid crystal display of the main player terminal.

On the other hand, at the sub player terminal 101B operated by a sub player having selected a main game, the main game is executed as well as in the main player terminal 101F, as described later. Therefore, in the liquid crystal display 201 of this sub player terminal 101B, as shown in FIG. 13, the main game is executed, whereby, when a face-down image of a card which is dealt by a dealer is displayed, a hand 3001 same as a dealer's hand displayed on the front display 104 is also displayed.

Further, the main control unit 301 executes a card deck preparing processing (step S2008). The card deck preparing processing is a processing for specifying a card deck used in dealing cards in a main game.

In other words, the main control unit 301 allocates card decks of the predetermined number shared by a plurality of main player terminals 101F, by means of a lottery, from among a plurality of card decks. Similarly, card decks of the same number to be individually used by the sub player terminal 101B having selected a main game are allocated by means of a lottery.

How to allocate card decks is not limitative thereto, and card decks may be allocated by means of sequential numbers to which a plurality of card decks are allocated.

In this regard, as described above, FIG. 1 described above shows an example of a specific situation of card decks used in a main game.

When the main control unit 301 executes such the card deck preparing processing (step S2008), the game start condition described above is realized. When the game start condition is realized, the processing in the sequence diagram of FIG. 8 or the like described later are executed.

[6. Exemplary Operation of the Gaming Machine]

Figure 8:
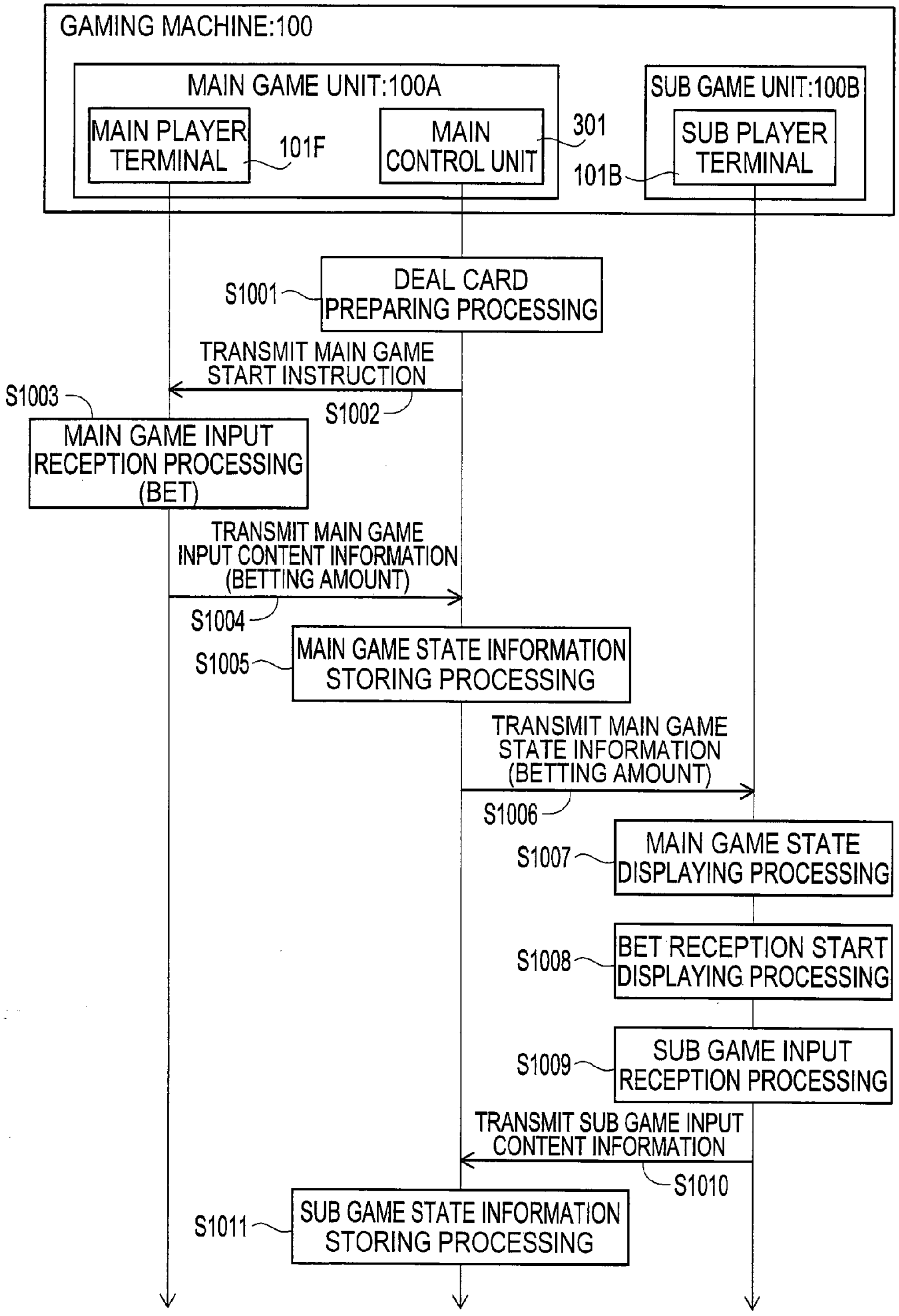
FIG. 8 is a sequence diagram showing an exemplary operation of the gaming machine.
Figure 11:
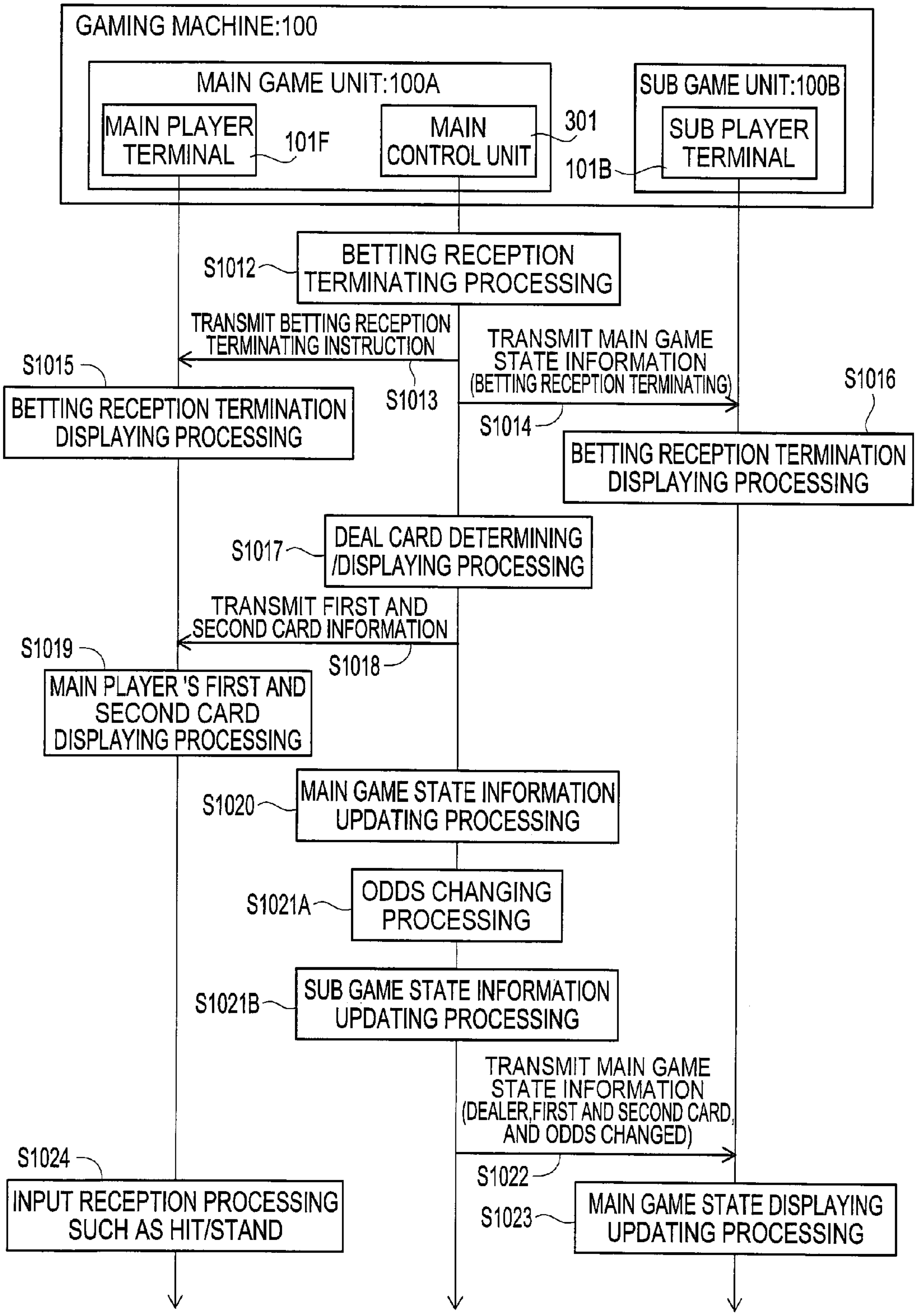
FIG. 11 is a sequence diagram showing an exemplary operation of the gaming machine, following the sequence diagram of FIG. 8.
Figure 14:
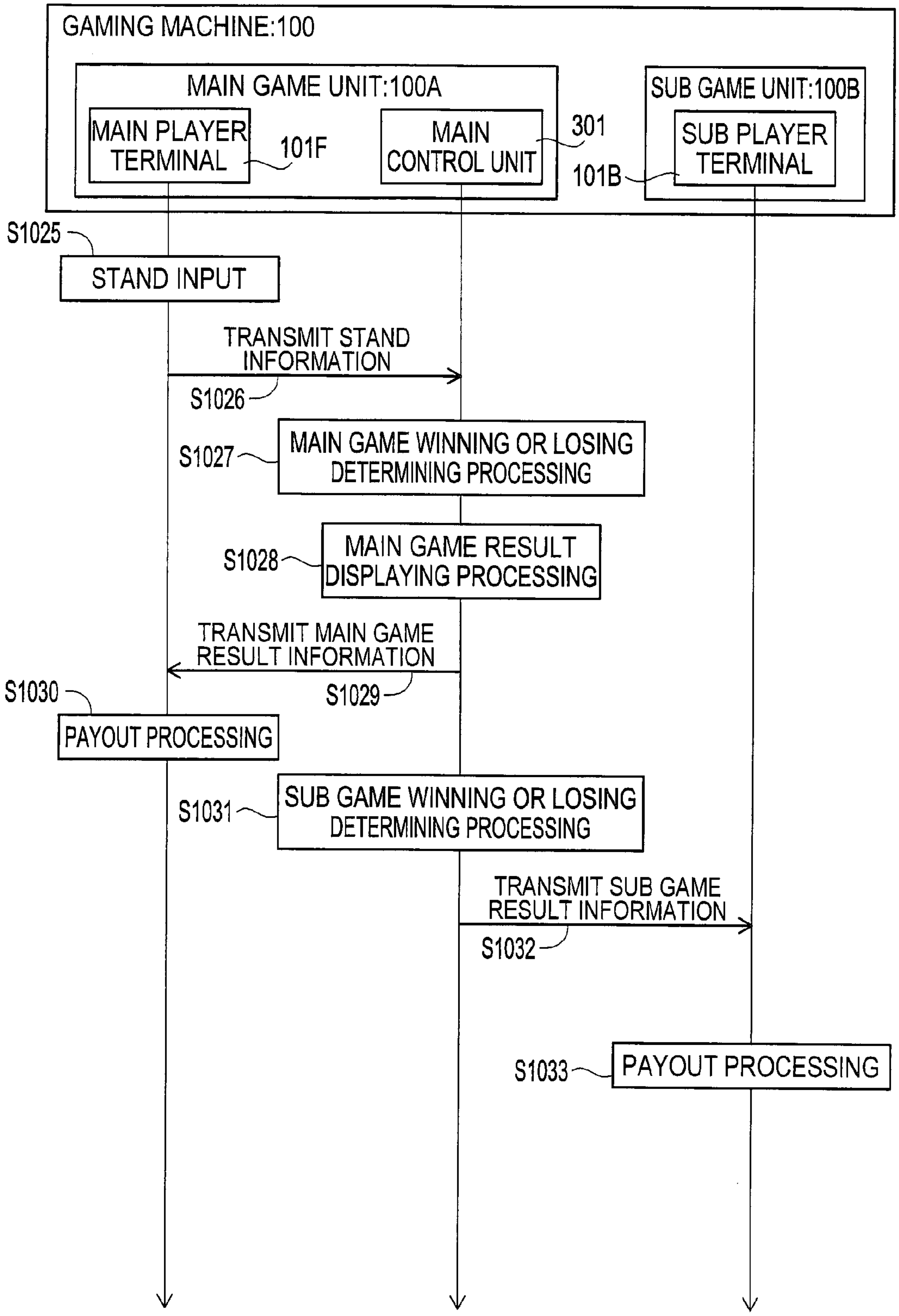
FIG. 14 is a sequence diagram showing an exemplary operation of the gaming machine, following the sequence diagram of FIG. 11.
Figure 15:
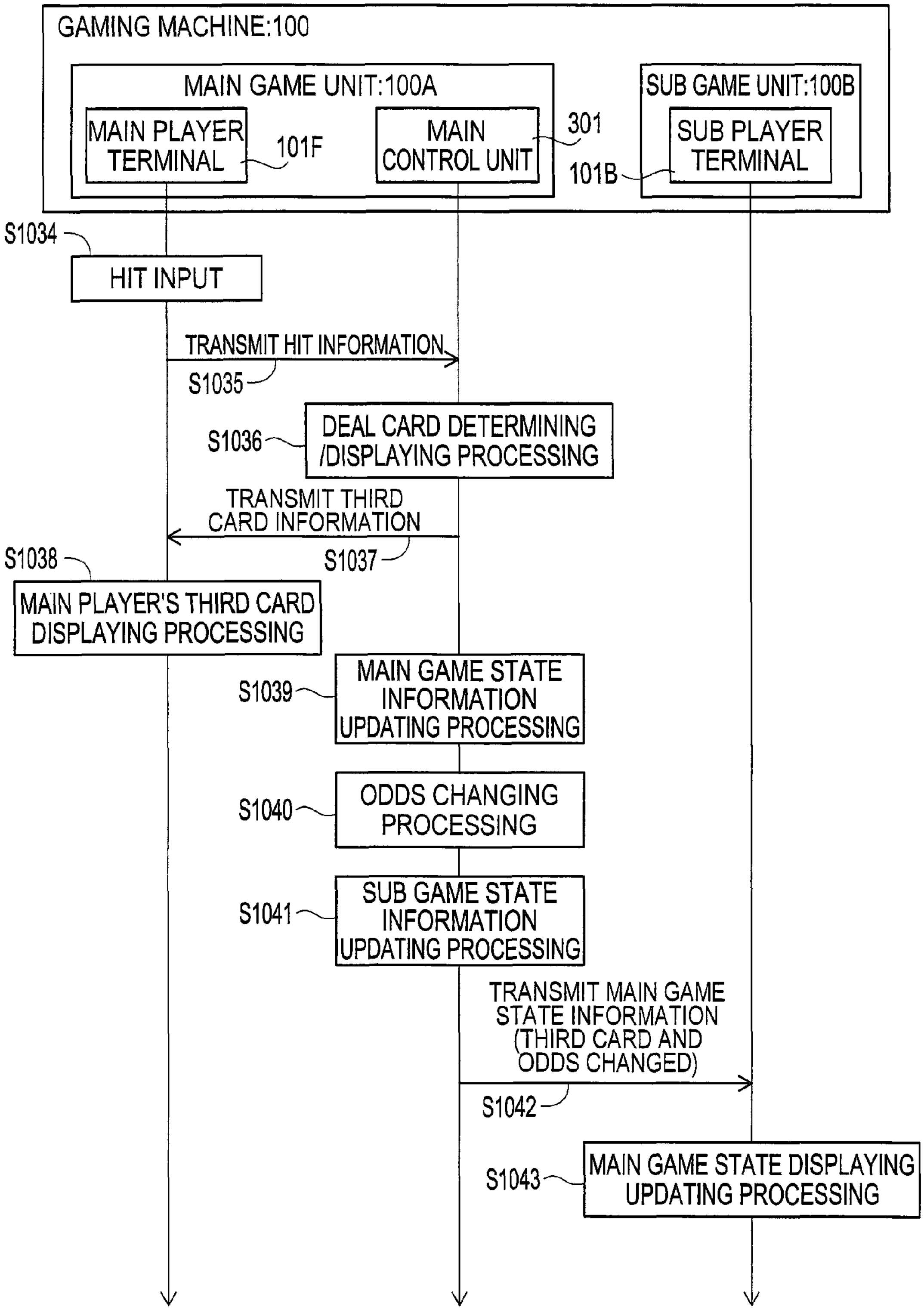
FIG. 15 is a sequence diagram showing an exemplary operation of the gaming machine, following the sequence diagram of FIG. 11.

Next, an exemplary operation of the gaming machine 100 according to the present embodiment will be described with reference to FIG. 8 to FIG. 15. FIG. 8 is a sequence diagram showing an exemplary operation of the gaming machine 100, FIG. 11 is a sequence diagram that follows FIG. 8, FIG. 14 is a sequence diagram that follows FIG. 11, and FIG. 15 is a sequence diagram that follows FIG. 11 in the case where a selection other than that of FIG. 14 has been made. Hereinafter, an exemplary operation of the gaming machine 100 will be described with reference to these sequence diagrams.

Because the sub player terminal 101B having selected a main game executes an operation similar to that of the main player terminal 101F, the sub player terminal 101B having selected a main game is omitted from FIG. 8, FIG. 11, FIG. 14, and FIG. 15 in order to avoid complication, and only the main player terminal 101F is shown.

In FIG. 8, FIG. 11, FIG. 14, and FIG. 15, with respect to the main player terminals 101F and the sub player terminals 101B, only one is shown as a typical example, and other main player terminals 101F and sub player terminals 101B are not shown.

First, when the game start condition is realized, the main control unit 301 executes a deal card preparing processing which is equivalent to a processing for preparing to deal shuffled cards by a dealer (step S1001). Specifically, assuming that N cards are used in one game, each number of numbers from 1 to N is randomly allocated to each card respectively (referred to as a deal order). The main control unit 301 determines cards to be dealt to the dealer or main players in accordance with this deal order.

With respect to this deal order, without being limitative thereto, cards can be selected every time by means of random number lottery.

When the deal card preparing processing (step S1001) terminates, a main game start instruction is transmitted to each of the main player terminals 101F (in more detail, terminal control unit 304F, hereinafter, simply referred to as a "main player terminal 101F") (step S1002).

As described above, although not shown, in step S1002, the main control unit 301 specifies a sub player terminal 101B operated by a sub player having selected a main game, based on the determination contents of the processing of determining a game executed by a sub player in step S2007 of FIG. 6 described above, and transmits the main game start instruction to the specified sub player terminal 101B as well.

Figure 9:
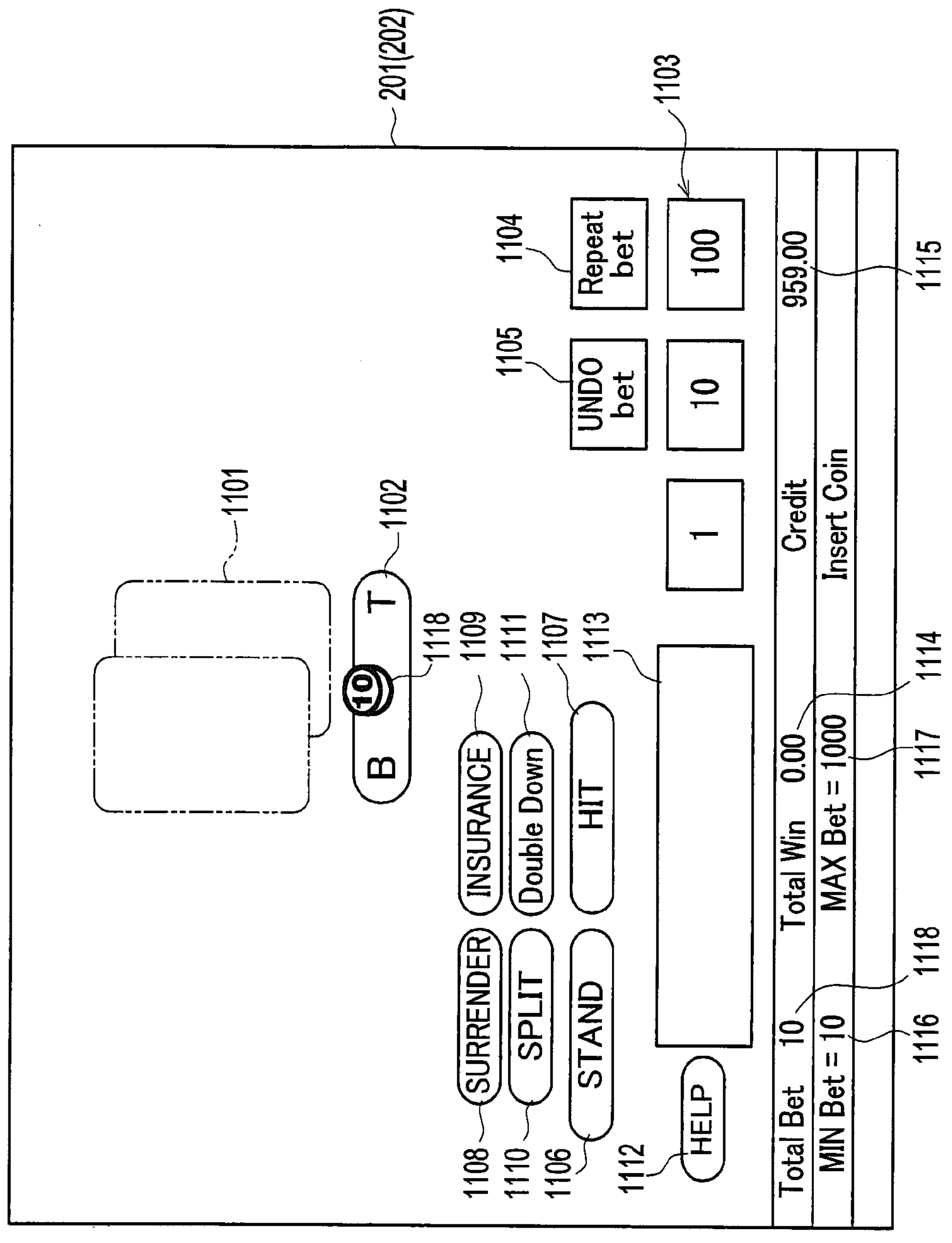
FIG. 9 is a view showing an example of a screen displayed on a liquid crystal display of the main player terminal.

The main player terminal section 101F having received the main game start instruction executes a main game input reception processing (step S1003). The main game input reception processing is a processing for promoting an input operation and determination (including specification of a betting amount), to main players, and then, acquiring the inputted contents as data. In this example, the main player is promoted for input of a betting amount. FIG. 9 shows an exemplary screen displayed on the liquid crystal display 201 of the main player terminal section 101F as a user input interface screen at the time of execution of the main game input reception processing. Hereinafter, the input interface screen described above will be described with reference to FIG. 9.

On the liquid crystal display 201, as shown in FIG. 9, a player cards display area 1101 is provided at a frontal position (at the side of the panel portion 103) in the liquid crystal display 201. However, at this time, a processing which is equivalent to dealing cards to a main player is not carried out, so that a card image is not displayed yet.

A chip display area 1102 is provided under the player cards display area 1101. An image 1118 of a chip which is equivalent to the number of coins that a main player has bet is displayed in the chip display area 1102 so as to give a sense of reality. When a player touches the chip display area 1102, a betting amount is determined by means of a touch panel 202, and then, the determined betting amount is transmitted to the main control unit 301. In other words, the chip display area 1102 also functions as a bet determination button.

At the lower right side of the chip display area 1102, a plurality of betting buttons 1103 are arranged. A main player can input a desired betting amount by appropriately touching this betting buttons 1103. In the illustrative example, values of “1”, “10”, and “100” are set to the respective betting buttons 1103, and the number of coins according to the value set by one touch is added to a betting amount.

Above the betting buttons 1103, a Repeat betting button 1104 and an UNDO betting button 1105 are arranged. A main player can bet the same number of coins as betted in the preceding game by pressing the Repeat betting button 1104. On the other hand, a main player can cancel the betting operation which was conducted previously, by touching the UNDO betting button 1105.

At the lower left side of the chip display area 1102, operating buttons used when a main player plays with the dealer are arranged. Specifically, as the operating buttons, a STAND button 1106, a HIT button 1107, a SURRENDER button 1108, an INSURANCE button 1109, a SPLIT button 1110, and a Double Down button 1111 are arranged.

The STAND button 1106 is an operating button to be touched at the time of the play by currently dealt cards without requesting another card be dealt. The HIT button 1107 is an operating button to be touched by a main player when deal of another card is requested in addition to already dealt cards. This HIT button 1107 can be continuously used until a total number of dealt cards is 21 or more.

The SURRENDER button 1108 is an operating button to be touched by a main player at the time of withdrawal from the play of a current game. When the SURRENDER button 1108 is selected, half of a betting amount at that time is collected by the dealer, whereas the remaining half is returned to the main player. The INSURANCE button 1109 is an operating button to be touched when insurance is applied in half of a betting amount at that time for Blackjack of dealer cards. Here, the SURRENDER button 1108 can be used in the case where the dealer’s face-up card (front side card) is a number other than A (Ace), and the INSURANCE button 1109 can be used in the case where the dealer’s face-up card is A (Ace).

The SPLIT button 1110 is an operating button to be touched in the case where two cards dealt in a game have the same number; the cards are split to two hands. When the SPLIT button 1110 is selected, a player can play by the two hands, respectively. After the cards are split into two hands, in the case where cards of the same number have been dealt again, the cards can be split again. In one game, up to three SPLIT operations are possible. A Double Down button 1111 is an operating button to be touched in the case where a betting amount is doubled in a game. After selection of the Double Down button 1111, it is conditioned that only one card is drawn and any more card cannot be drawn.

At the lower side of the HIT button 1108 and the STAND button 1107, a HELP button 1112 is arranged and a message area 1113 is provided. The HELP button 1112 is an operating button to be touched at the time of requesting explanation of a game (Blackjack). A message for supporting the progress of a game is displayed in the message area 1113 in response to the current game state. A message for explaining a game in the case where the HLP button 1112 has been selected is also displayed in this message area 1113.

At the bottom area of the liquid crystal display 201, a betting amount display area 1118 displaying an amount betted by a main player, an area for displaying credits acquired by a main player (acquired credit display area) 1114, and an area for displaying credits owned by a main player (owned credit display area) 1115. In addition, an area for displaying a lower limit of a betting amount (betting amount lower limit display area) 1116 and an area for displaying an upper limit of a betting amount (betting amount upper limit display area) 1117 are arranged. By displaying the lower limit and the upper limit of a betting amount, a main player is promoted to determine a betting amount in the range shown by these limits.

While the input interface screen is displayed, if a main player operates the betting buttons 1103, a chip image 1118 is displayed in the chip display area 1102 in response to an amount corresponding to that operation, so that a betting amount set by the main player can be checked.

Returning to FIG. 8, a description of an exemplary operation of the gaming machine 100 is continued.

A main player inputs a betting amount to the main player terminal 101F with reference to the input interface screen. When the main player’s input terminates, the main player terminal 101F generates main game input content information serving as information that corresponds to the input conditions of the main player, and then, transmits this main game input content information to the main control unit 301 (step S1004). In this context, the main game input content information includes main player terminal identification information showing information from which of main player terminals 101F transmitted, and information showing a betting amount. This main game input content information is individually transmitted from each main player terminal 101F to the main control unit 301.

Step S1003 and step S1004 are executed similarly at a sub player terminal 101B operated by a sub player having selected a main game. In particular, the interface screen shown in FIG. 9 is displayed at the liquid crystal display 201 of the sub player terminal 101B operated by a sub player having selected a main game.

The main control unit 301 having received the main game input content information generates a main game state information based on the received main game input content information, and then, executes a main game state information storing processing serving as a processing for storing the information (step S1005). By means of this storing processing, the main control unit 301 stores what actions each of main players and sub players having selected a main game has been taken (in this example, how much of the betting amount has been inputted).

Next, the main control unit 301 specifies the sub player terminal 101B operated by a sub player having selected a sub game, based on the determination contents of a processing of determining a game executed by a sub player in step S2007 of FIG. 6 described above, and then, transmits the main game state information to the specified sub player terminal 101B (step S1006). The main game state information includes information (information that is necessary for playing a sub game by a sub player) relating to a main game. The main control unit 301 generates the main game state information with the use of the main game input content information received from each main player terminal 101F. The main game state information includes the following contents, for example.

(1) Cards dealt to each main player terminal 101

(2) A betting amount in each main player terminal 101F (3) Winning rate in each main player terminal 101F (4) Winning and losing history in each main player terminal 101F (5) Cards dealt to the dealer Each sub player terminal 101B having received the main game state information executes a main game state displaying processing (step S1007). The main game state displaying processing is a processing for displaying a main game state display screen of announcing a game state and the like in each main player terminal 101F to a sub player. FIG. 10 shows an exemplary screen displayed on the liquid crystal display 201 of the sub player terminal 101B operated by a sub player having selected a sub game in the main game state displaying processing. This screen serves as a screen for announcing the game state in each main player terminal 101F to a sub player, and functions as the input interface screen for receiving input of the sub player relating to a sub game.

On this screen, the dealer cards image display area 1201 for displaying images of cards dealt to the dealer, the main player cards image display area 1202 for displaying images of cards dealt to a main player corresponding to each main player terminal 101F, the betting amount display area 1203 for displaying a betting amount serving as a gaming value that a main player has betted at the main player terminal 101F, the main player winning rate display area 1204 of the main player terminal 101F, and the winning and losing history display area 1205 for displaying winning and losing in the past five games are displayed.

A sub player having selected a sub game expects a main player who will win (acquire payment) in a main game, and bets a desired betting amount on the expected main player with reference to these displays. This is a content of a sub game that a sub player plays. When a sub player touches any select button areas 1206, it is assumed that a main player corresponding to the touched select button area 1206 has been selected as a bet target of a sub game.

At the lower side of the winning and losing history display area 1205, the select button area 1206 for a sub player to select a main player as a bet target of a sub game is arranged. When the selected main player wins in a main game, the sub player has won in the sub game, and acquires the payment as an award for the winning of the sub game.

At the lower side of the select button area 1206, the odds display area 1207 serving as an area of displaying an odds (a sub game odds) for determining a sub player's payment is arranged. The sub player's payment is calculated by multiplying the odds by a betting amount in the case where the sub player has won in the sub game. As described later, a sub game odds is changed in progress of a game.

On the lower right portion of the screen, a plurality of betting buttons 1210, an UNDO betting button 1211 at the right side of the betting buttons 1210, and a Repeat betting button 1212 are arranged. In addition, on the lower left portion of the screen, a HELP button 1208 is arranged and a message area 1209 is arranged. At the bottom area, a betting amount display area 1213 for displaying an amount betted by a sub player, an area for displaying credits acquired by a sub player (acquired credit display area 1214), and an area for displaying credits owned by a sub player (owned credit display area) 1215 are arranged. In addition, at the further lower side of above described areas, an area for displaying a lower limit in a sub game (betting amount lower limit display area) 1216 and an area for displaying an upper limit of a betting amount in a sub game (betting amount upper limit display area) 1217 are arranged. By displaying the lower limit and the upper limit of the betting amount, a sub player is promoted to determine a betting amount in the range displayed by these limits.

Following a main game state displaying processing (step S1007) serving as a processing for displaying the input interface screen described above, the sub player terminal 101B operated by a sub player having selected a sub game executes a betting reception start displaying processing according to the received main game state information (step S1008).

Following the bet reception start displaying processing (step S1008), the sub player terminal 101B operated by a sub player having selected a sub game executes a sub game input reception processing (step S1009). The sub game input reception processing is a processing for promoting a sub player's inputting data relating to selection and determination of a bet target in a sub game (including indication of a betting amount) and acquiring the inputted contents as data.

The sub player having selected a sub game inputs selection of a main player and a betting amount to the sub player terminal 101B with the use of the betting buttons 1210, the UNDO betting button 1211, the Repeat betting button 1212, and the select button areas 1206 or the like with reference to the input interface screen described above.

The sub player terminal 101B operated by a sub player having selected a sub game generates a sub game input content information serving as information that corresponds to the input contents of the sub player, and then, transmits the sub game input content information to the main control unit 301 (step S1010). This sub game input content information is transmitted to the main control unit 301 from the sub player terminal 101B operated by the sub player having selected the sub game.

The main control unit 301 having received the sub game input content information generates a sub game state information, based on the received sub game input content information, and executes a sub game state information storing processing serving as a processing for storing the generated information (step S1011). By means of this processing, the main control unit 301 stores what actions each sub player having selected a sub game has been taken.

Next, with reference to FIG. 11 a description of an exemplary operation of the gaming machine 100 after step S1011 will be continued. When a condition is realized for terminating a reception of a betting from a main player and a sub player having selected a sub game, the main control unit 301 executes a betting reception terminating processing (step S1012). The condition for terminating the reception of betting includes, for example, elapse of a predetermined time (for example, 1 minute) from transmission of the main game start instruction.

The betting reception terminating processing (step S1012) is a processing for determining whether or not the above termination condition is realized, and, generating a betting reception terminating instruction in the case where the condition is realized. The main control unit 301 executes the betting reception terminating processing (step 1012), and then, transmits the generated betting reception terminating instruction to each main player terminal 101F (step S1013).

Step S1013 described above is also executed with respect to the sub player terminal 1001B operated by a sub player having selected a main game in the same manner.

The main player terminal 101F having received the betting reception terminating instruction executes a betting reception termination displaying processing (step S1015). The betting reception termination displaying processing is a processing for displaying information for conveying information that a bet reception in a main game has been terminated to a main player on the liquid crystal display 201 of the main player terminal 101F serving as the input interface screen for a main player.

Step S1015 described above is also executed at the sub player terminal 101B operated by a sub player having selected a main game in the same manner.

Upon transmission of the betting reception termination instruction to each main player terminal 101F, the main control unit 301 transmits main game state information including a betting reception termination message to the sub player terminal 101B operated by a sub player having selected a sub game (step S1014).

The sub player terminal 101B having received this main game state information executes a betting reception termination displaying processing (step S1016). The betting reception termination displaying processing is a processing for displaying information for conveying information that a betting reception in a sub game has been terminated to a sub player at the liquid crystal display 201 of the sub player terminal 101B serving as the input interface screen for a sub player having selected a sub game.

The main control unit 301 executes a deal card determining/displaying processing serving as a processing for determining cards dealt to the dealer and main players or a sub player having selected a main game, and, displaying the dealt cards (excluding the cards dealt to the sub player having selected a main game) on the front display 104 (step S1017). The dealt cards are determined based on the deal order defined in the previous deal card preparing processing (FIG. 8, step S1001). For example, a card of a first deal order is determined to a first card of the dealer (first card), a card of a second deal order is determined to be a first card of a first main player, and a card of a third deal order is determined to be a first card of a second main player. Similarly, two cards are determined respectively for the dealer and each main player in accordance with the deal order.

Figure 12:
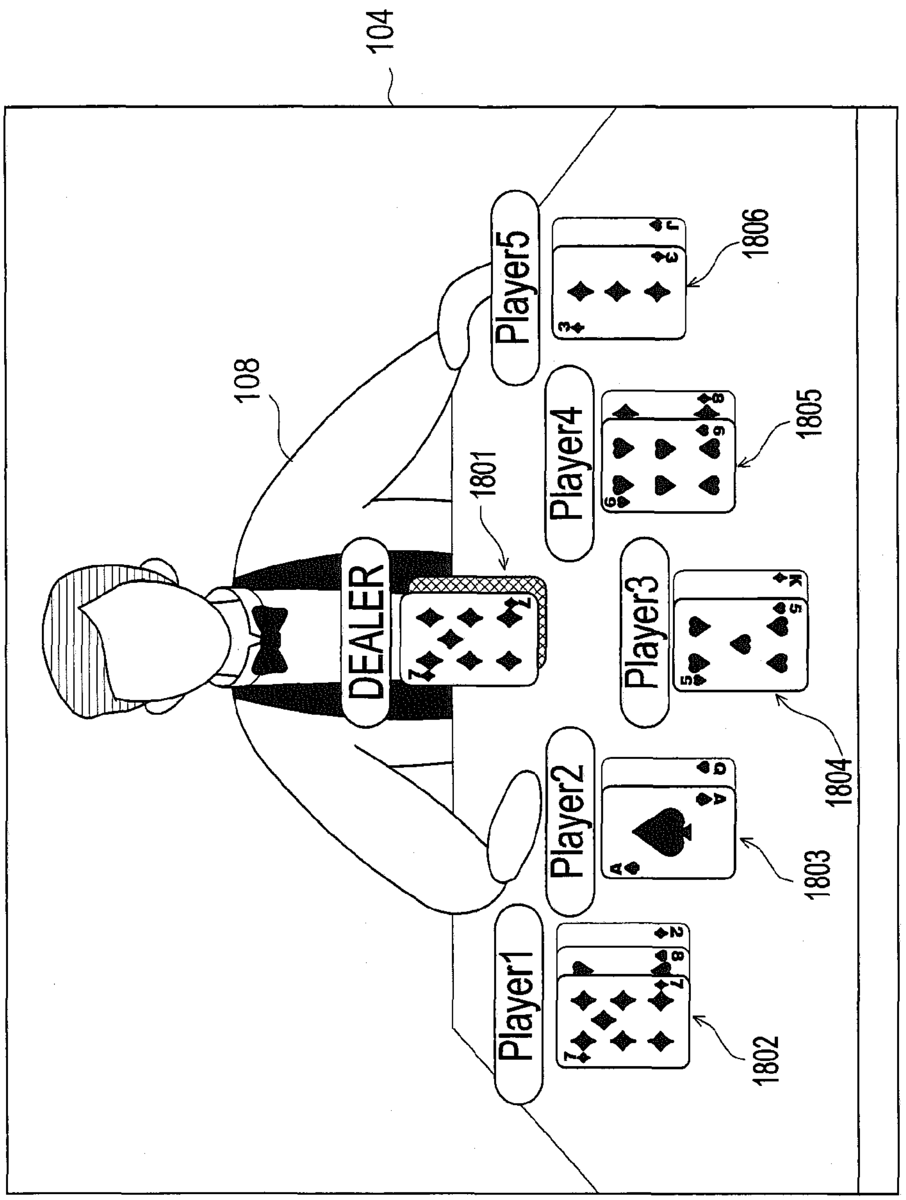
FIG. 12 is a view showing an example of a screen displayed on a front display.

FIG. 12 shows an exemplary screen displayed on the front display 104 by executing the deal card determining/displaying processing (step S1017). On the front display 104, a dealer image 108, a dealer cards display area 1801 serving as an area for displaying images of cards dealt to the dealer, and a main player cards display areas 1802, 1803, 1804, 1805, and 1806 serving as areas for displaying respectively images of cards dealt to each main player are arranged. In the dealer cards display area 1801 and the main player cards display areas 1802, 1803, 1804, 1805, and 1806, face-up images of the cards determined in accordance with the deal order described above are displayed respectively with exception of the dealer's second card after face-down image of the card determined in accordance with the deal order is displayed respectively once. In this manner, what cards have been dealt to the dealer and each main player is notified to each main player, each sub player, and galleries.

Returning to FIG. 11, a description of the exemplary operation of the gaming machine 100 will be continued in accordance with a sequence diagram.

When cards to be dealt are determined by means of the deal card determining/displaying processing (step S1017), the main control unit 301 executes a first and second card information transmission serving as a processing for notifying cards determined as dealt cards of the main player terminal 101F to the main player terminals 101F (step S1018). For example, in the example shown in FIG. 12, the main control unit 301 transmits, as the first and second card information, information for specifying "Diamond 7" serving as a first card and "Heart 8" serving as a second card, to the main player terminal 101F corresponding to the first main player (the leftmost portion of the screen, displayed as "Player 1"). Similarly, this control unit 301 transmits, as the first and second card information, information for specifying "Spade A (Ace)" serving as a first card and "Heart Q (Queen)" serving as a second card, to the main player terminal 101F corresponding to the second main player (the second one from the leftmost of the screen, displayed as "Player 2"). Similarly, this control unit 301 transmits respectively the first and second card information according to the respective dealt cards to each of main player terminals 101F which is corresponding to the third to fifth main players.

Step S1017 and step S1018 described above are also executed with respect to the sub player terminal 101B operated by a sub player having selected a main game in the same manner.

Returning to FIG. 11, a description of the exemplary operation of the gaming machine 100 will be continued in accordance with a sequence diagram.

Each main player terminal 101F having received the first and second card information described above executes a main player's first and second card displaying processing (step S1019). This processing displays a card image according to the received first and second card information in the player card display area 1101 of the liquid crystal display 201 of the main player terminal 101F.

In the player card display area 1101, a face-up image of the card determined in accordance with the deal order described above is displayed after a face-down image of the card determined in accordance with the deal order described above has been once displayed, whereby what card has been dealt to a main player is notified to the main player.

Further, in the exemplary screen shown in FIG. 13, when the face-down image of the card has been displayed, a hand 3001 same as a dealer's hand displayed on the front display 104 is also displayed.

The above step S1019 is also executed at the sub player terminal 101B operated by a sub player having selected a main game in the same manner.

Returning to FIG. 15, a description of the exemplary operation of the gaming machine 100 will be continued in accordance with a sequence diagram.

Following the deal card determining/displaying processing (step S1017), the main control unit 301 executes a main game state information updating processing (step S1020). A betting amount of each main player has already been stored in the previous main game state information storing processing (FIG. 8, step S1005). The current game state information updating processing is a processing for storing the first and second cards of each main player in addition to these betting amounts and storing the dealer's first and second cards.

Subsequently, the main control unit 301 executes an odds changing processing serving as a processing for increasing or decreasing the odds of determining a payment for a sub player having selected a sub game (referred to as the sub game odds) according to cards dealt a main player that the sub player has betted on (step S1021A). The odds changing processing is a processing for changing the sub game odds and making a sub game more interesting according to progress of a main game. As one specific example of the odds changing processing, it is possible to consider a method for calculating a winning rate of a main player from the dealer's first card (face-up card) and the main player's first and second cards, and then, increasing the sub game odds based on the winning rate. For the sub game odds before executing the odds changing processing, a predetermined default value may be used, or a value which calculated according to data on the betting amount, a winning rate, and a winning and losing history of the main player may be used.

Following the odds changing processing (step S1021A), the main control unit 301 executes a sub game state information updating processing (step S1021B). In the previous sub game state information storing processing (FIG. 8, step S1011), a main player (a bet target), a betting amount, and an initial odds of a sub players having already selected a sub game have been stored. The current sub game state information updating processing is a processing for updating and storing the sub game odds changed in the odds changing processing.

Further, the main control unit 301 transmits main game state information serving as information for specifying cards dealt to the dealer and each main player and information including the changed sub game odds, to the sub player terminal 1013 operated by a sub player having selected a sub game (step S1022).

The sub player terminal 101B having received the main game state information transmitted in step S1022 executes a main game state displaying updating processing (step S1023). This main game state displaying updating processing is a processing for updating the screen displayed on the liquid crystal display 201 of the sub player terminal 101B operated by a sub player having selected a sub game, based on the main game state information received in step S1022, that is, a processing for displaying each dealt card on the liquid crystal display 201 in this example.

The main player terminal 101F having received the first and second card information executes an input reception processing such as HIT/STAND serving as a processing for letting a main player input any of HIT (request for additional card), STAND (declaration of no need for additional card), SURRENDER, INSURANCE, SPLIT, and Double Down (step S1024).

In other words, the main player terminal 101F waits for the main player to make an input operation by any of operating buttons, i.e., a STAND button 1106, the HIT button 1107, the SURRENDER button 1108, the INSURANCE button 1109, the SPLIT button 1110, and the Double Down button 1111. In the case where any of these buttons is operated, the main player terminal 101F executes a processing according to the operated button.

FIG. 14 is a sequence diagram showing an exemplary operation of the gaming machine 100 in the case where the STAND button 1106 has been operated in the input reception processing such as HIT/STAND described above (step S1024). Hereinafter, an exemplary operation of the gaming machine 100 will be described in accordance with the sequence diagram of FIG. 14.

When a STAND input is executed by operation of the STAND button 1106 (step S1025), the main player terminal 101F transmits a STAND information to the main control unit 301 in order to notify that a main player has declared STAND (step S1026). When STAND is declared, all activities of the main player of the main player terminal 101F in that game terminate.

When activities of the main player terminates with respect to all of the main player terminal 101, the main control unit 301 executes a main game winning and losing determining processing for determining which main player has won the main game or how much the payment is (step S1027). This determination is made based on the main game state information updated in the previous step S1020.

The main control unit 301 having executed the main game winning and losing determining processing (step S1027) executes a main game result displaying processing in order to notify the result to each main player, each sub player, and galleries (step S1028). The main game result displaying processing is a processing for displaying the result of a main game on the front display 104.

Next, the main control unit 301 transmits main game result information to each main player terminal 101F (step S1029). This main game result information includes information as to whether or not a main player having played a game in the main player terminal 101F has won in the main game, and information on the payment amount in case that the main player has won.

Each main player terminal 101F having received the main game result information executes a payout processing based on the main game result information (step S1030). In other words, in the case where a main player having played the game in the main player terminal 101F has won in a main game, and the information on the payment amount is included in the received main game result information, each main player terminal 101F adds a value responsive to the payment amount to credits, or drives the hopper 814 to eject coins corresponding to the payment amount, thereby make the payment according to the main game.

The above steps S1025, S1026, and S1030 are also executed at the sub player terminal 101B operated by the sub player having selected the main game in the same manner.

In addition, the steps S1027 and S1029 are also executed with respect to the sub player terminal 101B operated by the sub player having selected the main game in the same manner.

Next, the main control unit 301 executes a sub game winning and losing determining processing for determining which sub player has won in a sub game, and how much the payment is (step S1031). This determination is made based on the sub game state information updated in the previous step S1021B and the contents of determination in the main game winning and losing determining processing (step S1027).

Next, the main control unit 301 transmits a sub game result information to the sub player terminal 101B operated by a sub player having selected a sub game (step S1032).

This sub game result information is based on the contents of determination of a sub game winning and losing determining processing. Furthermore this sub game result information includes information as to whether or not a sub player having played a game in the sub player terminal 101B has won in the sub game, and information on the payment amount in case that the sub player has won.

Each sub player terminal 101B having received the sub game result information executes a payout processing based on the sub game result information (step S1033). In other words, in the case where a sub player having played the game in the sub player terminal 101B has won in a sub game, and the information on the payment amount includes the received sub game result information, each sub player terminal 101B adds a value responsive to the payment amount to credits or drives the hopper 814 to eject coins corresponding to the payment amount, thereby making the payment according to the sub game.

Next, with reference to FIG. 15, a description will be given with respect to an exemplary operation of the gaming machine 100 in the case where the HIT button 1107 has been operated in the input reception processing such as HIT/STAND described above (FIG. 11, Step S1024). FIG. 15 is a sequence diagram showing an exemplary operation of the gaming machine 100 in the case where the HIT button 1107 has been operated.

When a HIT input is executed by operation of the HIT button 1107 (step S1034), the main player terminal 101F transmits a HIT information to the main control unit 301 in order to notify that a main player has declared HIT (step S1035).

Upon the reception of the HIT information, the main control unit 301 determines a card dealt to the main player having declared HIT, and then, executes a deal card determining/displaying processing serving as a processing for displaying the determined card on the front display 104 (step S1036). Deal card is determined based on the deal order defined in the previous deal card preparing processing (FIG. 8, step S1001). For example, in the case where a card from a first to twelfth has been dealt with the deal order, a card of the thirteenth deal order is determined as a third card for the main player having declared HIT.

When the deal card is determined by the deal card determining/displaying processing (step S1035), the main control unit 301 executes a third card information transmission serving as a processing for notifying a card determined as a third card of the main player terminal 101F to the main player terminal 101F having executed the HIT information transmission (step S1037). For example, the main control unit 301 transmits, as third card information, information for specifying "Diamond 6" serving as the third card to the main player terminal 101F corresponding to the first player (the leftmost portion of the screen, displayed as "Player 1").

The main player terminal 101F having received the third card information described above executes a main player's third card displaying processing (step S1038). This processing displays a card image according to the received third card information in the player cards display area 1101 of the liquid crystal display 201 of the main player terminal 101F.

The above steps S1034, S1035, and S1038 are also executed at the sub player terminal 101B operated by a sub player having selected a main game in the same manner.

In addition, the above steps S1036, S1028, and S1037 are also executed with respect to the sub player terminal 101B operated by a sub player having selected a main game in the same manner.

Following the deal card determining/displaying processing (step S1036) described above, the main control unit 301 executes a main game state information updating processing (step S1039). A betting amount and a first and second cards of each main player have already been stored in the previous main game state information updating processing (FIG. 11, Step S1020). The current main game state information updating processing is a processing for storing the third card dealt to the main player having declared HIT.

Then, the main control unit 301 executes an odds changing processing serving as a processing for increasing and decreasing the sub game odds according to the third card (step S1040). In this case, the odds changing processing is executed only for a sub player having selected the main player who has declared HIT as a bet target.

Following the odds changing processing (step S1040), the main control unit 301 executes a sub game state information updating processing (step S1041). In the previous sub game state information updating processing (FIG. 11, step S1021B), a main player (a bet target), a betting amount, and an initial odds (odds changed in the case where it is changed in step S1021A) of a sub player (having selected a sub game) have been stored. The current sub game state information updating processing is a processing for updating and storing the sub game odds changed in the odds changing processing in step S1040 while it is reflected in the sub game state information.

Further, the main control unit 301 transmits information for specifying a third card dealt to the main player in the sub player terminal 101B operated by a sub player having selected a sub game, i.e., main game state information including the changed sub game odds (step S1042).

The sub player terminal 101B having received the main game state information transmitted in step S1042 executes a main game state displaying updating processing (step S1043). This main game state displaying updating processing is a processing for updating a screen displayed on the liquid crystal display 201 of the sub player terminal 101B based on the received main game state information. In other words, this main game state displaying updating processing is a processing for additionally displaying the third card dealt to the main player having declared HIT in this example on the liquid crystal display 201.

Following step S1043, the processing operation of the gaming machine 100 returns to the input reception processing such as HIT/STAND (FIG. 11, Step S1024) again, and the similar processing is repeated until notification of the end of activities (STAND declaration and SURRENDER declaration) has been transmitted to the main control unit 301 from all main player terminals 101F and all sub player terminals 101B operated by a sub player having selected a main game.

According to the gaming machine 100 that makes operation as described above, a gaming machine which enables a sub player to enjoy both a main game and a sub game can be provided.

[7. Others]

The above embodiments may be modified as follows:

(1) While the main control unit 301 is provided at the main game unit 100A separated from the main player terminal 101F in the above embodiment, the present invention is not limitative to such a configuration. For example, without providing the main control unit 301 at the main game unit 100A, a program to be operated as the main control unit 301 is mounted on a terminal control unit 304F of any main player terminals 101F, whereby this terminal control unit 304F may function as a host computer of other main player terminals 101F and sub player terminal 101B. In other words, the present invention is achieved even if any one of main player terminals 101F is constructed as the main player terminal 101F, which also functions as the main control unit 301.

(2) While the main control unit 301 executes the sub game winning and losing determining processing (Step S1031, Refer to FIG. 14) in the above embodiment, the present invention is achieved even if the main control unit 301 transmits the main game result information to the sub player terminal 101B operated by a sub player having selected a sub game instead of executing the sub game winning and losing determining processing (step S1031), and the sub player terminal 101B executes the sub game winning and losing determining processing, based on this main game result information, and then, executes the payout processing (step S1033) based on the result of the sub game winning and losing determining processing.

(3) While the payment to a sub player in a sub game is determined according to the betting amount and the payment odds of the sub player, independent of the result of a main game of a main player targeted to be betted on in the above embodiment, the present invention is achieved even if the payment amount for a sub player in a sub game is determined by the result of a main player targeted to be betted on (the betting amount betted by a main player and the payment odds applied to the main player).

In such modified example, a sub player having selected a sub game may input only selection of a main player targeted to be betted on, at the time of execution of the sub game input reception processing (FIG. 8, S1009), and there is no need for inputting a betting amount. In addition, the sub game input content information to be transmitted to the main control unit 301 from the sub player terminal 101B operated by a sub player having selected a sub game includes only information indicating a main player selected by the sub player, and a betting amount is not included in the sub game input content information.

In addition, the main game state information to be transmitted from the main control unit 301 to the sub player terminal 101B operated by a sub player having selected a sub game includes a betting amount of a main player and the payment odds applied to the main player. In the main game state displaying updating processing (FIG. 11, S1023) to be executed later, these items of information are displayed on the liquid crystal display 201 of the sub player terminal 101B. In addition, a betting amount of a main player and the payment odds applied to a main player are stored by the main control unit 301 as part of the sub game state information on the sub game state information updating processing (FIG. 11, S1021B) or the like.

After that, in the sub game winning and losing determining processing (FIG. 14, S1031), the main control unit 301 determines a payment amount to a sub player in a sub game, based on the above sub game state information, more specifically, a betting amount of a main player targeted to be betted on by the sub player and the payment odds applied to the main player.

The processing operations other than the above description conform to the contents shown in FIG. 8, FIG. 11, FIG. 14, and FIG. 15 in the embodiment described above.

In addition, in the case where a betting amount of a main player has been changed in accordance with progress of a main game, a betting amount of a sub player who selects the main player is also changed by the main control unit 301 and/or the sub player terminal 101B concurrently. As modification of the modified example, the main control unit 301 may control the participation of a sub player into a sub game, only in the case where the sub player has betted the same amount of credits as a betting amount of the selected main player (for example, 10 credits).

In addition, in the modified example described above, the main control unit 301 determines the payment odds applied to a main player targeted to be betted on in a sub game at the payment odds (the sub game odds) of a sub player who selects the main player. In addition, in the case where the payment odds applied to a main player has been changed in accordance with progress of a main game, the payment odds (the sub game odds) of a sub player who selects the main player is changed by the main control unit 301 and/or the sub player terminal 101B concurrently.

According to the modified example, the payment of a sub player in a sub game is determined depending on progress of a game of a main player, thus making it possible to draw attention of the sub player in the sub game and enhance motivation to participate into a game.

(4) In the above embodiment, a sub player inputs selection of a main game or a sub game to the sub player terminal 101B by touching on the select button areas 1206 or the like with reference to the selection interface screen of FIG. 7 described above. Therefore the sub player can play either the main game or the sub game based on the input of the selection. In this regard, the sub player terminal 101B may be controlled, that a main game is selected by all sub players automatically (step S2005, reference to FIG. 6). In this case, a dealer, all main players, and all the sub players will play an identical main game. When a main game is executed, dealer cards and each of main player cards are determined by using a predetermined number of card decks (reference to FIG. 1). On the other hand, when an identical main game is executed, the same predetermined number of card decks are allocated to all sub players individually. The identical main game proceeds by using each of the allocated card decks respectively. The cards which have a combination of the same suit and the rank of the dealer cards are excluded from the cards dealt to each of the sub player (step S2008, reference to FIG. 6).

Figure 16:
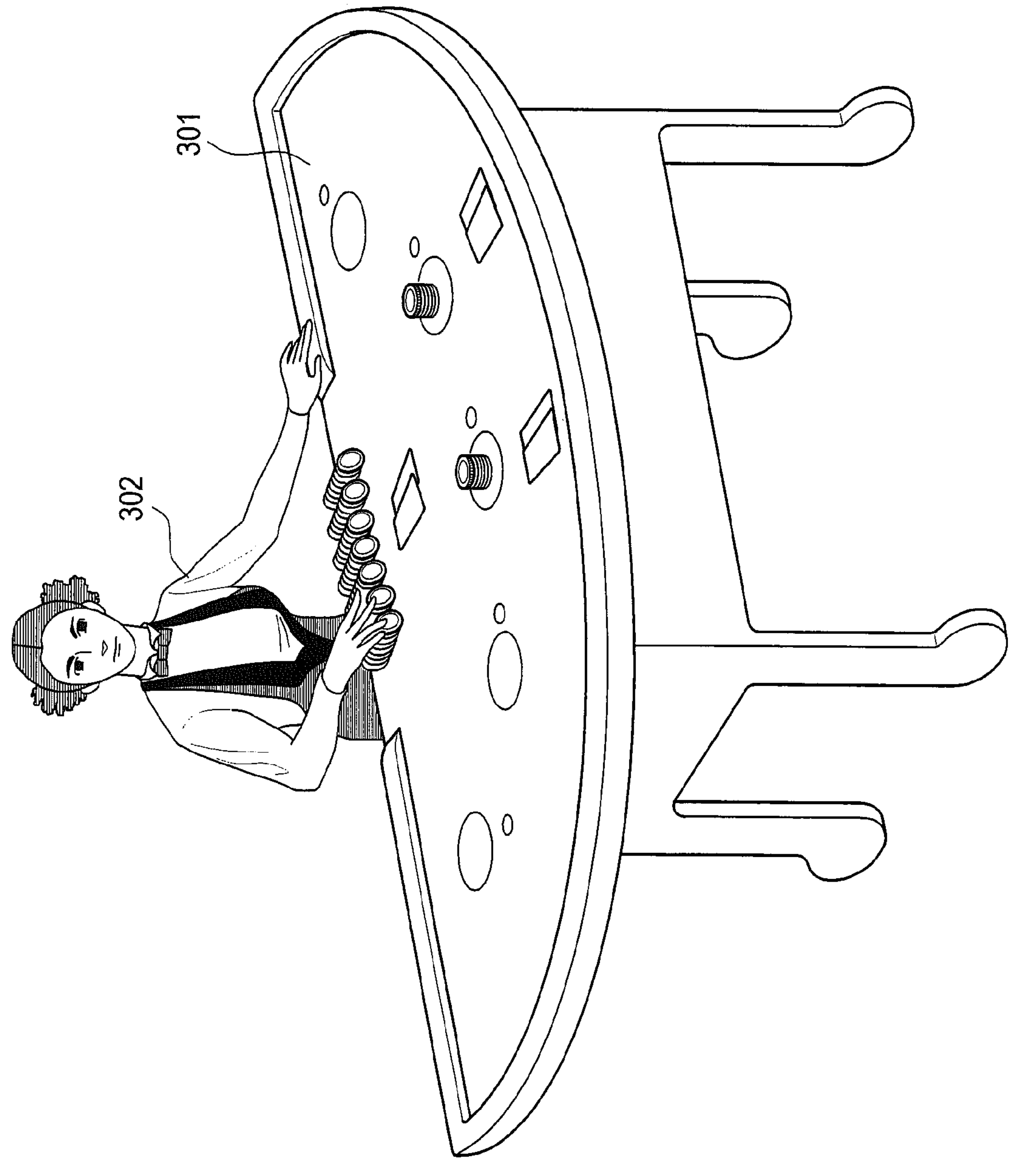
FIG. 16 is a schematic view of an exemplary application of the present invention to a table game.

The present embodiment can also be applied to a card game playing method which progresses by a dealer 302 and players (not shown) on a gaming table 301, as shown in FIG. 16.

What is claimed is:

1. A card gaming machine comprising:

a plurality of main terminals at which each player can play a card game respectively;

a plurality of extended terminals at which each player can play a card game respectively;

a plurality of card decks consisting one group of a plurality of cards required for a card game, respectively; and a processor programmed to execute the same card game at the same time at each of the main terminals and each of the extended terminals through controlling each of the main terminals and each of the extended terminals by executing processes of:

(a) progressing the card game at each of the main terminals by sharing and using a first predetermined number of the card decks allocated to all of the main terminals from all of the card decks; and (b) respectively progressing the card game at each of the extend terminals by individually using a second predetermined number of the card decks allocated respectively to each of the extend terminals from all of the card decks.

2. The card gaming machine according to claim 1, wherein the processor is programmed to equalize the first predetermined number and each of the second predetermined numbers.

3. A card gaming machine comprising:

a plurality of main terminals at which each player can play a card game respectively;

a plurality of extended terminals at which each player can play a card game respectively;

a plurality of card decks consisting one group of a plurality of cards required for a card game, respectively; and a processor programmed to execute the same card game at the same time at each of the main terminals and each of the extended terminals through controlling each of the main terminals and each of the extended terminals by executing processes of:

(a) progressing the card game at each of the main terminals by sharing and using a first predetermined number of the card decks allocated to all of the main terminals from all of the card decks;

(b) respectively progressing the card game at each of the extend terminals by individually using a second predetermined number of the card decks allocated respectively to each of the extend terminals from all of the card decks;

(c) dealing common dealer cards used commonly at each of the main terminals from the card decks of the first predetermined number at time of starting to progress the card game at each of the main terminals;

(d) respectively dealing individual dealer cards used individually at each of the extend terminals from the card decks of the second predetermined number at time of starting to progress the card game at each of the extend terminals respectively; and (e) making a suit and a rank of the common dealer cards agree with a suit and a rank of each of the individual dealer cards at time of dealing each of the dealer cards respectively.

4. The card gaming machine according to claim 3, wherein the processor is programmed to equalize the first predetermined number and each of the second predetermined numbers.

5. A card gaming machine comprising:

a plurality of main terminals at which each player can play a card game respectively;

a common display device sharing by all of the main terminals;

a plurality of extended terminals at which each player can play a card game respectively;

a plurality of individual display devices provided respectively on each of the extend terminals;

a plurality of card decks consisting one group of a plurality of cards required for a card game, respectively; and a processor programmed to execute the same card game at the same time at each of the main terminals and each of the extended terminals through controlling each of the main terminals, the common display device, each of the extended terminals, and each of the individual display devices by executing processes of:

(a) progressing the card game at each of the main terminals by sharing and using a first predetermined number of the card decks allocated to all of the main terminals from all of the card decks;

(b) respectively progressing the card game at each of the extend terminals by individually using a second predetermined number of the card decks allocated respectively to each of the extend terminals from all of the card decks;

(c) displaying the virtual dealer on the common display device at time of progressing the card game at each of the main terminals; and (d) displaying a part of the virtual dealer, which are displaying on the common display device, on each of the individual display devices at time of progressing the card game at each of the extend terminals respectively.

6. The card gaming machine according to claim 5, wherein the processor is programmed to equalize the first predetermined number and each of the second predetermined numbers.

7. A control method of a card gaming machine in which each player can play a card game respectively at a plurality of main terminals and each player can play a card game respectively at a plurality of extended terminals, wherein, so as to execute the same card game at the same time at each of the main terminals and each of the extended terminals through controlling each of the main terminals and each of the extended terminals by using a plurality of card decks consisting of one group of a plurality of cards required for a card game, respectively, the control method of the card gaming machine comprises steps of:

(a) progressing the card game at each of the main terminals by sharing and using a first predetermined number of the card decks allocated to all of the main terminals from all of the card decks; and (b) respectively progressing the card game at each of the extended terminals by individually using a second predetermined number of the card decks allocated respectively to each of the extended terminals from all of the card decks.

* * * * *